(12) United States Patent
Ye et al.

(10) Patent No.: US 10,917,792 B2
(45) Date of Patent: Feb. 9, 2021

(54) METHOD FOR ESTABLISHING WIRELESS LOCAL AREA NETWORK CONNECTION, APPARATUS, AND TERMINAL

(71) Applicant: Huawei Technologies Co., Ltd., Shenzhen (CN)

(72) Inventors: Fei Ye, Wuhan (CN); Yongming Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/488,816

(22) PCT Filed: Aug. 4, 2017

(86) PCT No.: PCT/CN2017/096008
§ 371 (c)(1),
(2) Date: Aug. 26, 2019

(87) PCT Pub. No.: WO2018/153028
PCT Pub. Date: Aug. 30, 2018

(65) Prior Publication Data
US 2020/0236737 A1    Jul. 23, 2020

(30) Foreign Application Priority Data
Feb. 27, 2017    (CN) .......................... 2017 1 0109482

(51) Int. Cl.
*H04W 12/08*    (2009.01)
*H04W 12/06*    (2009.01)
(Continued)

(52) U.S. Cl.
CPC ........... *H04W 12/08* (2013.01); *H04W 12/06* (2013.01); *H04W 12/0608* (2019.01);
(Continued)

(58) Field of Classification Search
CPC ..... H04W 12/08; H04W 12/06; H04W 48/08; H04W 48/16; H04W 48/18; H04W 48/20; H04W 84/12; H04W 12/0608
See application file for complete search history.

(56) References Cited

U.S. PATENT DOCUMENTS

2011/0274000 A1\* 11/2011 King ..................... H04W 48/20
370/252
2014/0026060 A1\* 1/2014 Abbott ............. H04M 1/72519
715/738
(Continued)

FOREIGN PATENT DOCUMENTS

CN    103024929 A    4/2013
CN    104159228 A    11/2014
(Continued)

OTHER PUBLICATIONS

Machine Translation and Abstract of Chinese Publication No. CN103024929, Apr. 3, 2013, 21 pages.
(Continued)

*Primary Examiner* — Benjamin H Elliott, IV
(74) *Attorney, Agent, or Firm* — Conley Rose, P.C.

(57) ABSTRACT

A method for establishing a wireless a WLAN connection is provided, comprising: in response to first input of a user, displaying a first setting interface that includes at least two identifiers pointing to a first hotspot, where a first identifier in the at least two identifiers indicates a password-free connection to the first hotspot by using a first application, and a second identifier indicates a connection to the first hotspot by using a native wireless local area network of the terminal; in response to an operation of selecting the first identifier by the user, establishing a WLAN connection to the first hotspot by using the first application; and in response to an operation of selecting the second identifier by (Continued)

the user, establishing a WLAN connection to the first hotspot by using native WLAN connection logic of the terminal.

20 Claims, 16 Drawing Sheets

(51) Int. Cl.
*H04W 48/08* (2009.01)
*H04W 48/16* (2009.01)
*H04W 48/18* (2009.01)
*H04W 48/20* (2009.01)
*H04W 84/12* (2009.01)

(52) U.S. Cl.
CPC ............ *H04W 48/08* (2013.01); *H04W 48/16* (2013.01); *H04W 48/18* (2013.01); *H04W 48/20* (2013.01); *H04W 84/12* (2013.01)

(56) References Cited

U.S. PATENT DOCUMENTS

| | | | | |
|---|---|---|---|---|
| 2014/0048705 | A1* | 2/2014 | Reilly | H01J 49/04 250/282 |
| 2014/0137206 | A1* | 5/2014 | Hansmann | H04W 12/04 726/4 |
| 2015/0097689 | A1* | 4/2015 | Logue | H04L 65/1036 340/632 |
| 2016/0269394 | A1* | 9/2016 | Zhong | H04W 12/06 |
| 2017/0048705 | A1* | 2/2017 | Fujita | H04W 12/0609 |
| 2018/0027025 | A1* | 1/2018 | Ma | H04L 63/083 726/7 |
| 2018/0376523 | A1* | 12/2018 | Li | H04W 76/10 |
| 2020/0236737 | A1* | 7/2020 | Ye | H04W 48/16 |

FOREIGN PATENT DOCUMENTS

| | | |
|---|---|---|
| CN | 104506732 A | 4/2015 |
| CN | 104618941 A | 5/2015 |
| CN | 303358561 S | 9/2015 |
| CN | 105227358 A | 1/2016 |
| CN | 105682015 A | 6/2016 |
| CN | 105828415 A | 8/2016 |
| CN | 105916103 A | 8/2016 |
| CN | 303826262 S | 8/2016 |
| EP | 3007477 A1 | 4/2016 |
| GB | 2440193 A | 1/2008 |
| WO | WO-2015074179 A1 * | 5/2015 ............ H04W 12/06 |

OTHER PUBLICATIONS

Machine Translation and Abstract of Chinese Publication No. CN104506732, Apr. 8, 2015, 20 pages.
Machine Translation and Abstract of Chinese Publication No. CN104618941, May 13, 2015, 5 pages.
Machine Translation and Abstract of Chinese Publication No. CN105227358, Jan. 6, 2016, 11 pages.
Foreign Communication From a Counterpart Application, Chinese Application No. 201780009445.8, Chinese Office Action dated Dec. 10, 2019, 10 pages.
Foreign Communication From a Counterpart Application, European Application No. 17898171.8, Extended European Search Report dated Oct. 29, 2019, 7 pages.
Machine Translation and Abstract of Chinese Publication No. CN105916103, Aug. 31, 2016, 30 pages.
Machine Translation and Abstract of Chinese Publication No. CN104159228, Nov. 19, 2014, 10 pages.
Machine Translation and Abstract of Chinese Publication No. CN105828415, Aug. 3, 2016, 25 pages.
Zhaojian, M., "A Web App to Test the Speed of Mobile Broadband Acess Network and the Implementation for Wifi Auto-Switch," China Excellent Master's Thesis Full-text Database Information Technology Series, Apr. 15, 2015, 74 pages.
Abstract of Zhaojian, M., "A Web App to Test the Speed of Mobile Broadband Acess Network and the Implementation for Wifi Auto-Switch," China Excellent Master's Thesis Full-text Database Information Technology Series, Apr. 15, 2015, 1 pages.
Foreign Communication From a Counterpart Application, PCT Application No. PCT/CN2017/096008, English Translation of International Search Report dated Nov. 20, 2017, 2 pages.
Foreign Communication From a Counterpart Application, PCT Application No. PCT/CN2017/096008, English Translation of Written Opinion dated Nov. 20, 2017, 3 pages.

* cited by examiner

METHOD FOR ESTABLISHING WIRELESS LOCAL AREA NETWORK CONNECTION, APPARATUS, AND TERMINAL

CROSS-REFERENCE TO RELATED APPLICATIONS

The application is a national stage of International Application No. PCT/CN2017/096008 file d on Aug. 4, 2017, which claims priority to Chinese Patent Application No. 201710109482.8, filed on Feb. 27, 2017. Both of the aforementioned applications are hereby incorporated by reference in their entireties.

TECHNICAL FIELD

This application relates to the field of communications technologies, and in particular, to a method for establishing a wireless local area network connection, an apparatus, and a terminal.

BACKGROUND

A wireless local area network technology enables a user to conveniently access a network resource wirelessly anytime and anywhere. As one of wireless local area network (WLAN) technologies, Wireless Fidelity (Wi-Fi) is widely applied.

The user may connect to a Wi-Fi hotspot in two manners. A first manner is as follows: A terminal searches for a nearby Wi-Fi hotspot; service set identifiers SSID) of all Wi-Fi hotspots that are searched out are displayed in a Wi-Fi setting interface of the terminal (that is, a native Wi-Fi interface of the terminal); and the terminal responds to SSID selection by the user, receives a Wi-Fi password that is input by the user, and connects to a selected target Wi-Fi hotspot based on an SSID and the Wi-Fi password. A second manner is as follows: A terminal may instantly request Wi-Fi hotspot data from a network side by using a first application (for example, Wi-Fi Master Key, Skytone, or a free Wi-Fi Internet access assistant), so as to connect to a Wi-Fi hotspot without using a password, where the network side records Wi-Fi hotspot data collected through various channels, such as an SSID and a Wi-Fi password.

However, in different scenarios, the user may need to switch between the foregoing two access manners to connect to a Wi-Fi hotspot. During the switching, the user needs to control the terminal to frequently switch between the native Wi-Fi interface of the terminal and a Wi-Fi interface of the first application. As a result, user experience is relatively poor.

SUMMARY

This application provides a method for establishing a wireless local area network connection, an apparatus, and a terminal, so as to improve user experience when a user controls a terminal to connect to a Wi-Fi hotspot.

To achieve the foregoing objective, the following technical solutions are used in this application.

According to a first aspect, this application provides a method for establishing a wireless local area network connection, where the method may include: in response to first input of a user, displaying, by a terminal (an electronic terminal), a first setting interface of the terminal, where the first setting interface includes at least two link identifiers pointing to a first hotspot, a first link identifier in the at least two link identifiers indicates a link for establishing a password-free connection to the first hotspot by using a first application, and a second link identifier indicates a link for establishing a connection to the first hotspot by using a native wireless local area network of the terminal; in response to an operation of selecting the first link identifier by the user, establishing a wireless local area network connection to the first hotspot by using the first application; and in response to an operation of selecting the second link identifier by the user, establishing a wireless local area network connection to the first hotspot by using native wireless local area network connection logic of the terminal.

According to the method for establishing a wireless local area network connection provided in this application, the terminal may display, in the first setting interface (that is, a native Wi-Fi setting interface of the terminal), both the password-free connection that is performed by the first application and the native wireless local area network connection of the terminal, where the two connections both point to the first hotspot. In this way, the user can freely select "establishing the wireless local area network connection by using the native wireless local area network connection logic of the terminal" or "establishing the wireless local area network connection by using the first application" in one interface based on preference or a requirement of the user. Without such a solution, the user needs to predetermine whether to establish the wireless local area network connection by using the native Wi-Fi setting interface or by using the first application, and then access a selected interface to select a hotspot, to establish a WLAN connection. If the user changes mind or does not find any ideal hotspot in the selected interface, the user needs to exit the current interface and then access another interface to perform selection. Therefore, according to the solution in this embodiment, switching between the native Wi-Fi setting interface of the terminal and a Wi-Fi interface of the first application due to different user requirements can be avoided, and user experience when the user controls the terminal to connect to a Wi-Fi hotspot can be improved.

Optionally, the first link identifier is displayed in a first link set, and the first link set includes a set of at least hotspots to which a password-free connection can be established by using the first application; and the second link identifier is displayed in a second link set, and the second link set includes a set of hotspots to which a connection can be established by using the native wireless local area network of the terminal. In other words, the terminal may establish, by using the first application, a wireless local area network connection to any one of at least two wireless local area networks searched out by the first application.

Optionally, the first hotspot may be a wireless local area network hotspot whose signal strength is highest. In other words, by using the first application, the terminal may choose to establish a wireless local area network connection to the wireless local area network hotspot whose signal strength is highest. Specifically, the "in response to an operation of selecting the first link identifier by the user, establishing a wireless local area network connection to the first hotspot by using the first application" may include: in response to the operation of selecting the first link identifier by the user, selecting, from the first link set, a hotspot that is searched out by the first application and whose signal strength is highest; and establishing, by using the first application, the wireless local area network connection to the hotspot whose signal strength is highest.

Optionally, after the terminal establishes, by using the first application, the wireless local area network connection to the wireless local area network whose signal strength is highest, the terminal may further display a display interface that includes the following prompt information: "Your terminal has accessed a wireless local area network whose connection signal strength is highest".

It can be understood that the first application may obtain Wi-Fi data of at least two wireless local area networks, but the user may expect to control the terminal to access, by using the first application, a wireless local area network specified by the user, instead of accessing a wireless local area network selected by the terminal from the at least two wireless local area networks.

In this case, the "in response to first input of a user, displaying a first setting interface of the terminal, where the first setting interface includes at least two link identifiers pointing to a first hotspot" may include: in response to the first input of the user, displaying the first link set and the second link set; and in response to an operation of unfolding the first link set by the user, displaying one or more link identifiers in the first link set in the first setting interface, where the one or more link identifiers in the first link set include at least the first link identifier.

In this application, the terminal may further display the one or more link identifiers in the first link set in the first setting interface in response to the operation of unfolding the first link set by the user. To be specific, the terminal may display an SSID list of wireless local area networks that are searched out by the first application and that can be connected to without a password. In this way, the user can select, from the SSID list, an SSID of a wireless local area network that the user expects to access, so that the terminal can establish, by using the first application, a wireless local area network connection to the wireless local area network selected by the user.

Further, more than one first application used for wireless local area network connection may be installed on the terminal. For example, two applications, "Universal Wi-Fi" and "Skytone", may be installed on the terminal at the same time. Both the two applications can search for a hotspot. In this scenario, the first link set includes one or more link identifiers corresponding to a first application in the at least two applications and one or more link identifiers corresponding to a second application in the at least two applications. Wireless local area network Wi-Fi password cracking capabilities of the first application and the second application may be different. Therefore, different applications may search out different link identifiers for which password-free connections can be implemented. To be specific, SSIDs of wireless local area networks that can be connected to without a password and that are searched out by different applications may be different. In other words, wireless local area networks searched out by the first application and the second application in the at least two applications are the same or are different.

With reference to any one of the first aspect or the foregoing possible implementations, in another possible implementation, the "in response to first input of a user, displaying a first setting interface of the terminal" includes: in response to the first input of the user, displaying the first setting interface when the terminal includes the first application. In other words, before displaying the first setting interface, the terminal may first determine whether the terminal includes the first application.

Further, the method in this application may further include: in response to the first input of the user, displaying a second setting interface of the terminal when the terminal does not include the first application, where the second setting interface includes the second link identifier pointing to the first hotspot, and does not include the first link identifier pointing to the first hotspot. In other words, when the terminal does not include the first application, the terminal may directly display the native Wi-Fi interface of the terminal. In addition, the terminal may establish a wireless local area network connection by using the native wireless local area network connection logic of the terminal, in response to an operation of choosing, by the user, to establish a wireless local area network connection by using the second link.

According to a second aspect, this application provides a terminal. The terminal includes a display module, a first connection module, and a second connection module. The display module is configured to: in response to first input of a user, display a first setting interface of the terminal, where the first setting interface includes at least two link identifiers pointing to a first hotspot, a first link identifier in the at least two link identifiers indicates a password-free connection that is established to the first hotspot by using a first application, and a second link identifier indicates a connection that is established to the first hotspot by using a native wireless local area network of the terminal. The first connection module is configured to: in response to an operation of selecting, by the user, the first link identifier displayed by the display module, establish a wireless local area network connection to the first hotspot by using the first application. The second connection module is configured to: in response to an operation of selecting, by the user, the second link identifier displayed by the display module, establish a wireless local area network connection to the first hotspot by using native wireless local area network connection logic of the terminal.

With reference to the second aspect, in a first possible implementation, the first link identifier displayed by the display module is displayed in a first link set, and the first link set includes a set of at least hotspots to which a password-free connection can be established by using the first application; and the second link identifier displayed by the display module is displayed in a second link set, and the second link set includes a set of hotspots to which a connection can be established by using the native wireless local area network of the terminal.

With reference to the first possible implementation, in a second possible implementation, the first connection module is specifically configured to: in response to the operation of selecting the first link identifier by the user, select, from the first link set, a hotspot that is searched out by the first application and whose signal strength is highest; and establish, by using the first application, the wireless local area network connection to the hotspot whose signal strength is highest.

With reference to the first possible implementation, in a third possible implementation, the display module is specifically configured to: in response to the first input of the user, display the first link set and the second link set; and in response to an operation of unfolding the first link set by the user display one or more link identifiers in the first link set in the first setting interface, where the one or more link identifiers in the first link set include at least the first link identifier.

With reference to any one of the second aspect or the foregoing possible implementations, in a fourth possible implementation, the display module is specifically configured to: in response to the first input of the user, display the first setting interface when the terminal includes the first application.

With reference to the fourth possible implementation, in a fifth possible implementation, the display module is further configured to: in response to the first input of the user, display a second setting interface of the terminal when the terminal does not include the first application, where the second setting interface includes the second link identifier pointing to the first hotspot, and does not include the first link identifier pointing to the first hotspot.

According to a third aspect, this application provides a terminal. The terminal includes one or more processors, a memory, a communications interface, and a display. The memory, the communications interface, and the display are coupled to the one or more processors. The memory is configured to store computer program code, where the computer program code includes a computer instruction. When the one or more processors execute the computer instruction, the terminal performs the method for establishing a wireless local area network connection according to any one of the first aspect or the possible implementations of the first aspect in this application. The display is configured to display an image generated by the processor. The communications interface is configured to communicate with a wireless local area network hotspot, to establish a wireless local area network connection to the wireless local area network hotspot.

According to a fourth aspect, this application provides a computer storage medium, where the computer storage medium includes a computer instruction. When the computer instruction is executed on a terminal, the terminal is enabled to perform the method for establishing a wireless local area network connection according to any one of the first aspect or the possible implementations of the first aspect in this application.

According to a fifth aspect, this application provides a computer program product. When the computer program product runs on a computer, the computer is enabled to perform the method for establishing a wireless local area network connection according to any one of the first aspect or the possible implementations of the first aspect in this application.

It can be understood that the terminals provided in the second aspect and the third aspect, the computer storage medium provided in the fourth aspect, and the computer program product provided in the fifth aspect are all configured to perform the corresponding methods provided in the foregoing. Therefore, for beneficial effects that can be achieved by the terminals, the computer storage medium, and the computer program product, reference may be made to beneficial effects of the corresponding methods provided in the foregoing, and details are not described herein again.

DESCRIPTION OF EMBODIMENTS

In the following, the terms "first" and "second" are merely intended for a purpose of description, but shall not be understood as an indication or implication of relative importance or an implicit indication of a quantity of indicated technical features. Therefore, a feature qualified by "first" or "second" may explicitly or implicitly include one or more features. In the descriptions of this application, unless otherwise specified, "a plurality of" means two or more than two.

This application provides a method for establishing a wireless local area network connection, and a terminal. The method may be applied to a process of connecting to a Wi-Fi hotspot by a terminal. The terminal may establish a wireless local area network connection to the Wi-Fi hotspot by using native wireless local area network connection logic of the terminal. Alternatively, the terminal may establish a wireless local area network connection to the Wi-Fi hotspot by using a first application on the terminal.

For example, the first application n this application is an application program that is installed on the terminal and that can automatically obtain information about a nearby free Wi-Fi hotspot and establish a Wi-Fi connection. All hotspot information obtained by the first application is based on a cloud database. The cloud database stores tens of thousands of pieces of Wi-Fi hotspot data.

The terminal in this application may be an electronic device with a Wi-Fi access function. For example, the terminal may be a mobile phone (such as a mobile phone 100 shown in FIG. 3), a tablet computer, a personal computer (Personal Computer, PC), a personal digital assistant (personal digital assistant, PDA), a smartwatch, a netbook, or a wearable electronic device. A specific form of the device is not specially limited in this application.

Figure 1:
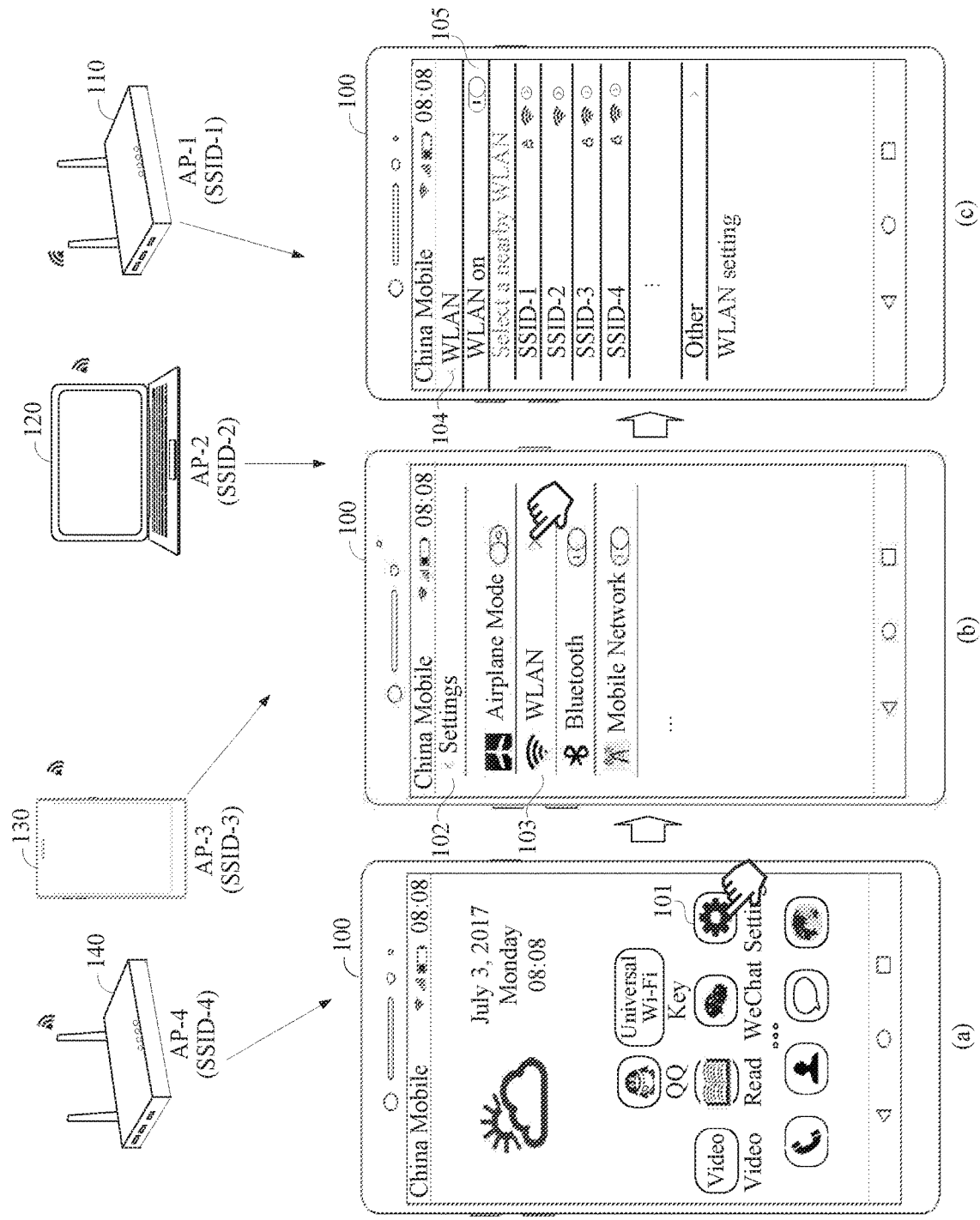
FIG. 1 is a first schematic diagram of a Wi-Fi network architecture to which a method for establishing a wireless local area network connection according to this application is applied.

FIG. 1 is a schematic diagram of a Wi-Fi network architecture to which a method for establishing a wireless local area network connection according to this application is applied. As shown in FIG. 1, the Wi-Fi network architecture may include a mobile phone 100, a router 110 (that is, an access point (Access Point, AP)-1), a notebook computer 120 (that is, an AP-2), a mobile phone 130 (that is, an AP-3), and a router 140 (that is, an AP-4). FIG. 1(*c*) in FIG. 1 shows a native Wi-Fi setting interface of the mobile phone 100.

The router 110, the notebook computer 120, the mobile phone 130, and the router 140 are located around the mobile phone 100, and may be used as APs to broadcast a Wi-Fi frame to a nearby terminal (including the mobile phone 100) so that the nearby terminal can detect a Wi-Fi signal of the AP and can further access a wireless local area network corresponding to the AP. The Wi-Fi frame may be a probe request (Probe Request) frame used to broadcast wireless local area network information (for example, an SSID) of the AP.

For example, it is assumed that an SSID of a wireless local area network corresponding to the AP-1 (that is, the router 110) is an SSID-1, an SSID of a wireless local area network corresponding to the AP-2 (that is, the notebook computer 120) is an SSID-2, an SSID of a wireless local area network corresponding to the AP-3 (that is, the mobile phone 130) is an SSID-3, and an SSID corresponding to a wireless local area network corresponding to the AP-4 (that is, the router 140) is an SSID-4.

As shown in FIG. 1, after a finger of a user taps a "Settings" application icon on a terminal screen of the mobile phone 100 shown in FIG. 1(*a*), the mobile phone 100 may display a "setting interface" 102 shown in FIG. 1(*b*). The "setting interface" 102 shown in FIG. 1(*b*) includes function options such as an "Airplane Mode" option, a "WLAN" option 103, a "Bluetooth" option, and a "Mobile Network" option. After the finger of the user taps the "WLAN" option 103 in FIG. 1(*b*), the mobile phone 100 may display the "Wi-Fi setting interface" shown in FIG. 1(*c*). The "Wi-Fi setting interface" shown in FIG. 1(*c*) includes a "wireless local area network switch" option 105, an SSID (such as the SSID-1, the SSID-2, the SSID-3, and the SSID-4) of a wireless local area network searched out by the mobile phone 100, and the like. In this application, the "Wi-Fi setting interface" shown in FIG. 1(*c*) may also be referred to as the "native Wi-Fi setting interface". To be specific, the "native Wi-Fi setting interface" of the terminal may be the "Wi-Fi setting interface" that is displayed upon a tap on the "WLAN" option 103 in the "setting interface" 102 shown in FIG. 1(*b*), in response to input that is performed by the user from the system application "Settings" 101 on the terminal.

It can be learned from the "native Wi-Fi setting interface" 104 shown in FIG. 1(*c*) that the wireless local area network corresponding to the "SSID-1", the wireless local area network corresponding to the "SSID-3", and the wireless local area network corresponding to the "SSID-4" are encrypted wireless local area networks (in other words, when the mobile phone 100 accesses the wireless local area network corresponding to the "SSID-1", the wireless local area network corresponding to the "SSID-3", and the wireless local area network corresponding to the "SSID-4", corresponding Wi-Fi passwords need to be input), and the wireless local area network corresponding to the "SSID-2" is a password-free wireless local area network (in other words, the mobile phone 100 can access the wireless local area network corresponding to the "SSID-2", without inputting a Wi-Fi password).

When the user taps any one of the SSID options (that is, any one of the SSID-1, the SSID-2, the SSID-3, and the SSID-4) displayed by the mobile phone 100 shown in FIG. 1(*c*), the mobile phone 100 may display a "Wi-Fi password input interface" corresponding to the SSID selected by the user (for example, the SSID-1). After the user inputs, in the "Wi-Fi password input interface", a Wi-Fi password of the wireless local area network corresponding to the SSID-1, the mobile phone 100 may send a Wi-Fi access request (that is, a Wi-Fi frame) to the AP-1 (that is, the router 110), to request to access the wireless local area network corresponding to the SSID-1. For a specific function of each function option in the "setting interface" 102 shown in FIG. 1(*b*), refer to detailed descriptions of a corresponding function option in a mobile phone in the prior art. Details are not described herein in this application.

Figure 2:
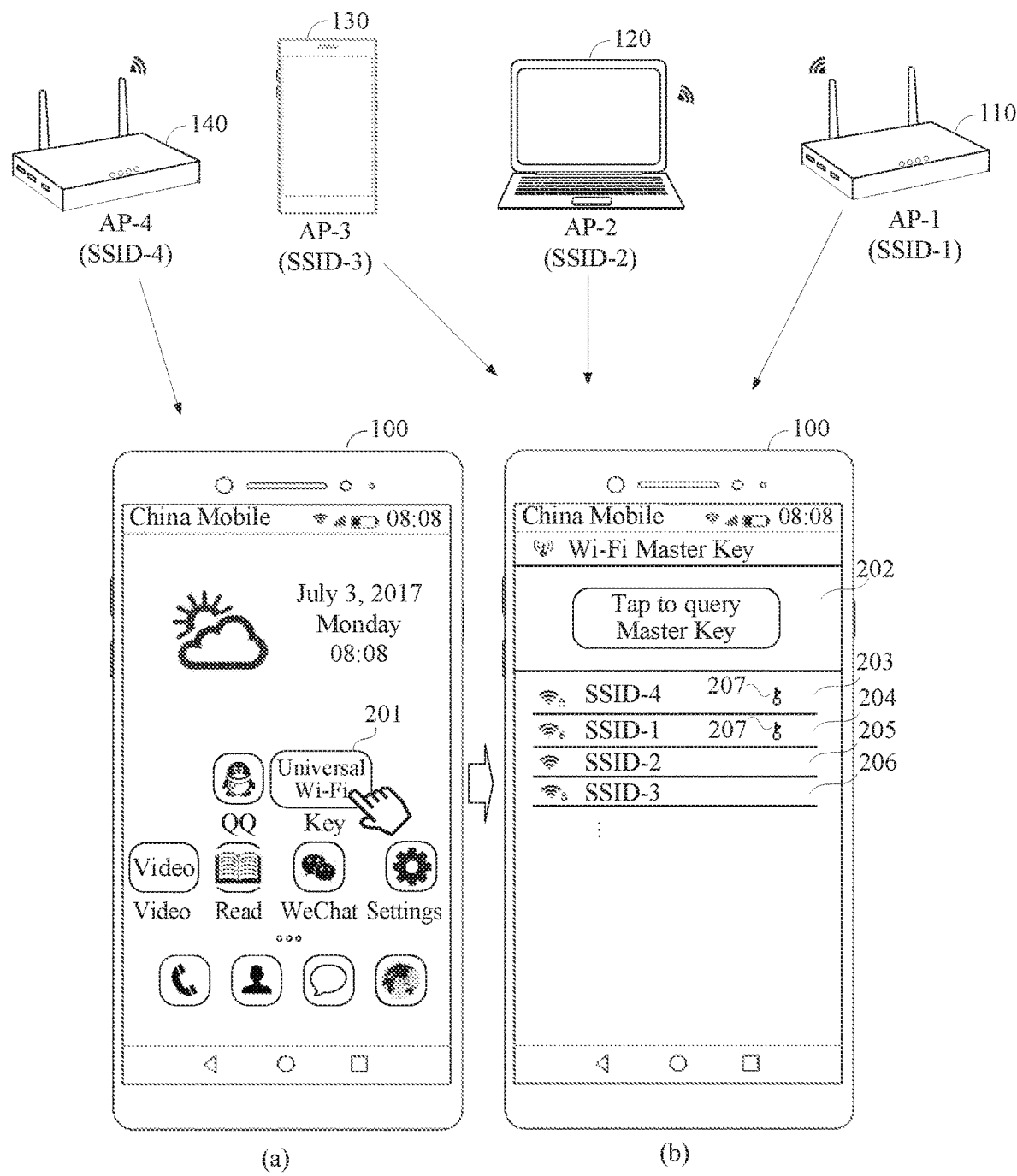
FIG. 2 is a second schematic diagram of a Wi-Fi network architecture to which a method for establishing a wireless local area network connection according to this application is applied.

FIG. 2 is a schematic diagram of a same Wi-Fi network architecture as that in FIG. 1. FIG. 2(*b*) in FIG. 2 shows a Wi-Fi setting interface of a first application of a mobile phone 100.

For example, the first application is an application program corresponding to a "Universal Wi-Fi" icon 201 shown in FIG. 2(*a*). After a finger of a user taps the "Universal Wi-Fi" icon 201 on a terminal screen of the mobile phone 100 shown in FIG. 2(*a*), the mobile phone 100 may display a "Wi-Fi Master Key interface" 202 (that is, the Wi-Fi setting interface of the first application) shown in FIG. 2(*b*). The "Wi-Fi Master Key" 202 shown in FIG. 2(*b*) includes SSIDs (such as an SSID-1, an SSID-2, an SSID-3, and an SSID-4) searched out by the mobile phone 100 by using the first application (that is, the "Universal Wi-Fi interface"), and the like. As shown in FIG. 2(*b*), the "Wi-Fi Master Key interface" 202 may include an "SSID-4" option 203, an "SSID-1" option 204, an "SSID-2" option 205, and an "SSID-3" option 206.

A wireless local area network corresponding to the "SSID-1", a wireless local area network corresponding to the "SSID-3", and a wireless local area network corresponding to the "SSID-4" are encrypted wireless local area networks, and Wi-Fi password complexity varies between the wireless local area networks. Therefore, the first application (such as the "Universal Wi-Fi") possibly can decrypt only wireless local area networks corresponding to some of the SSIDs. For example, it is assumed that the application program "Universal Wi-Fi" on the mobile phone 100 can decrypt the wireless local area network corresponding to the "SSID-4" and the wireless local area network corresponding to the "SSID-1", but cannot decrypt the wireless local area network corresponding to the "SSID-3". As shown in FIG. 2(*b*), in the "Wi-Fi Master Key interface" 202 of the mobile phone 100, the "SSID-4" option 203 and the "SSID-1" option 204 each include an unlock flag 207, and the "SSID-3" option 206 does not include the unlock flag 207.

It should be noted that an application used for wireless local area network connection in this application may include but is not limited to the "Universal Wi-Fi". For example, the application in this application may further include application programs such as "Skytone", "Wi-Fi Master Key", and "Wi-Fi Manager". Specific content of the application is not limited in this application.

When a user switches between the foregoing two access manners to connect to a Wi-Fi hotspot, the user needs to control a terminal to frequently switch between a native Wi-Fi setting interface of the terminal and a Wi-Fi interface of a first application. As a result, user experience is relatively poor. To resolve this problem, the foregoing two access manners may be combined in the method for establishing a wireless local area network connection according to this application. In this way, the native Wi-Fi setting interface of the terminal not only displays an SSID of a wireless local area network searched out by the terminal, but also displays an SSID of a wireless local area network searched out by the first application. This provides different connection approaches to a same hotspot, so that the user can select "establishing a wireless local area network connection by using native wireless local area network connection logic of the terminal" or "establishing a wireless local area network connection by using the first application" based on preference or a requirement of the user.

Figure 3:
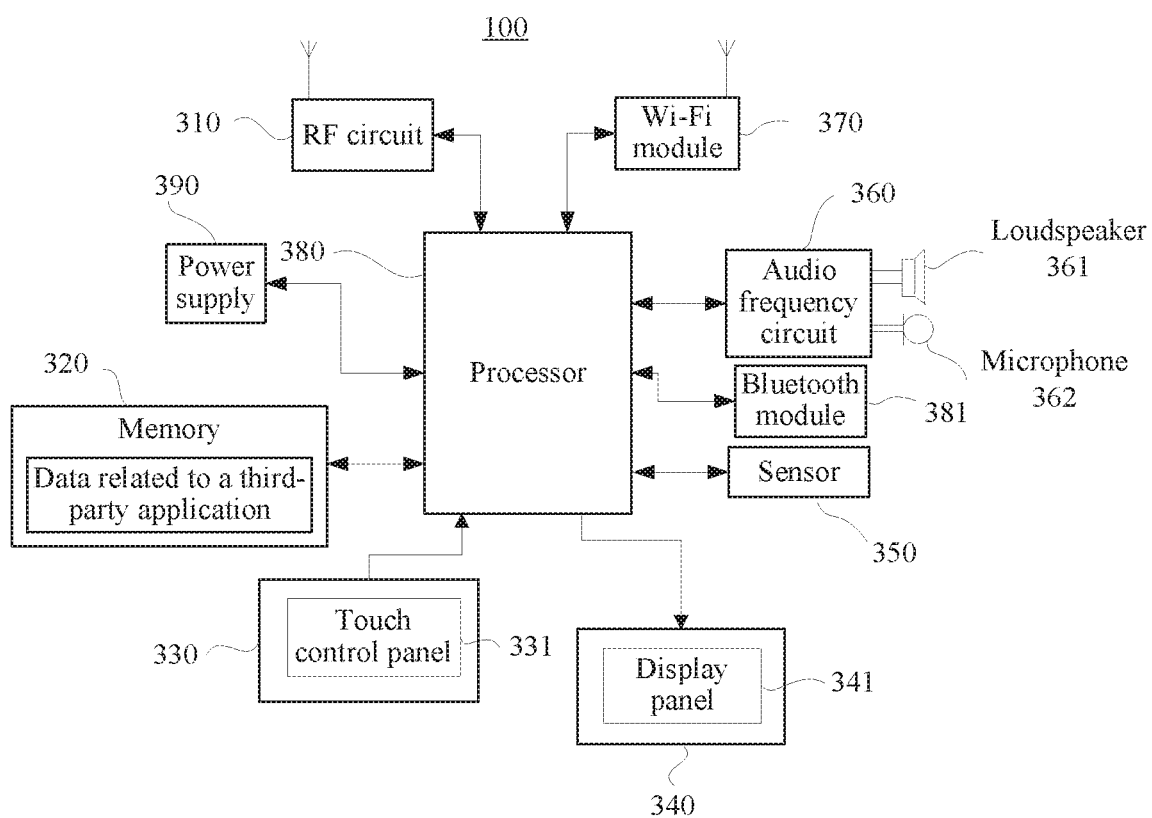
FIG. 3 is a schematic structural diagram of hardware of a mobile phone according to this application.

In the following embodiments, how a terminal implements specific technical solutions in the embodiments is described by using a mobile phone as an example. As shown in FIG. 3, the terminal in the embodiments may be a mobile phone 100. The following specifically describes the embodiments by using the mobile phone 100 as an example.

It should be understood that the mobile phone 100 shown in the figure is merely an example of the terminal. In addition, the mobile phone 100 may have more or fewer parts than those shown in the figure, may combine two or more parts, or may have parts disposed differently. Various parts shown in FIG. 3 may be implemented in hardware including one or more signal processing and/or application-specific integrated circuits, software, or a combination of hardware and software.

As shown in FIG. 3, the mobile phone 100 includes parts such as an RF (Radio Frequency, radio frequency) circuit 310, a memory 320, an input unit 330, a display unit 340, a sensor 350, an audio frequency circuit 360, a Wi-Fi module 370, a processor 380, and a power supply 390. A person skilled in the art may understand that a mobile phone structure shown in FIG. 3 does not constitute any limitation on the mobile phone, and the mobile phone may include more or fewer parts than those shown in the figure, or a combination of some parts, or parts disposed differently.

The following specifically describes each constituent part of the mobile phone 100 with reference to FIG. 3.

The RF circuit 310 may be configured to receive and send signals during information receiving and sending or during a call, and may receive downlink information from a base station and send the downlink information to the processor 380 for processing. In addition, the RF circuit 310 sends uplink-related data to the base station. Usually, the RF circuit includes but is not limited to devices such as an antenna, at least one amplifier, a transceiver, a coupler, a low noise amplifier, and a duplexer. In addition, the RF circuit 310 may further communicate with a network and another mobile device through wireless communication. For the wireless communication, any communications standard or protocol may be used, including but not limited to Global System for Mobile Communications, General Packet Radio Service, Code Division Multiple Access, Wideband Code Division Multiple Access, Long Term Evolution, an email, a short message service, and the like.

The memory 320 may be configured to store a software program and data. The processor 380 runs the software program and the data stored in the memory 320, to perform various functions of the mobile phone 100 and data processing. The memory 320 may mainly include a program storage area and a data storage area. The program storage area may store an operating system, an application program required by at least one function (for example, a voice playback function and a picture playback function), and the like. The data storage area may store data (for example, audio data and a phone book) created based on use of the mobile phone 100, and the like. In addition, the memory 320 may include a high-speed random access memory, and may further include a nonvolatile memory, for example, at least one magnetic disk storage device, a flash memory device, or another non-volatile solid-state storage device. In the following embodiments, the memory 320 stores an operating system that enables the mobile phone 100 to run, for example, an iOS® operating system developed by Apple, an Android® open-source operating system developed by Google, or a Windows® operating system developed by Microsoft.

The input unit 330 (such as a touchscreen) may be configured to receive input digital or character information, and generate signal input that is related to user setting and function control of the mobile phone 100. Specifically, the input unit 330 may include a touch control panel 331 that is shown in FIG. 3 and that is disposed on a front face of the mobile phone 100. The touch control panel 331 can collect a touch operation (for example, an operation performed by a user on the touch control panel 331 or near the touch control panel 331 by using a finger, a stylus, or any other proper object or accessory) performed by the user on or near the touch control panel 331, and drive a corresponding connection apparatus according to a preset program. Optionally, the touch control panel 331 may include two parts: a touch detection apparatus and a touch controller (which are not shown in FIG. 3). The touch detection apparatus detects a location touched by the user, detects a signal generated from a touch operation, and transmits the signal to the touch controller. The touch controller receives touch information from the touch detection apparatus, converts the touch information into touch point coordinates, and then sends the touch point coordinates to the processor 380. Moreover, the touch controller can receive and execute an instruction sent by the processor 380. In addition, the touch control panel 331 may be implemented in a plurality of types, such as a resistive type, a capacitive type, an infrared type, and a surface acoustic wave type.

The display unit 340 (that is, a display screen) may be configured to display information that is input by the user or information that is provided for the user, and a graphical user interface (Graphical User Interface, GUI) of various menus of the mobile phone 100. The display unit 340 may include a display panel 341 disposed on the front face of the mobile phone 100. The display panel 341 may be configured in a form of a liquid crystal display, a light emitting diode, or the like.

In some embodiments, the touch control panel 331 covers the display panel 341. After detecting a touch operation that is performed on or near the touch control panel 331, the touch control panel 331 transmits information about the touch operation to the processor 380 to determine a touch event. Then, the processor 380 provides corresponding visual output on the display panel 341 based on a touch event type. Although in FIG. 3, the touch control panel 331 and the display panel 341 are used as two independent parts to implement input and output functions of the mobile phone 100, yet in some embodiments, the touch control panel 331 and the display panel 341 may be integrated to implement the input and output functions of the mobile phone 100. The integrated touch control panel 331 and display panel 341 may be briefly referred to as a touch display screen.

In some other embodiments, a pressure sensor may be further configured for the touch control panel 331. In this way, when the user performs a touch operation on the touch control panel, the touch control panel can further detect pressure of the touch operation, so that the mobile phone 100 can detect the touch operation more accurately.

The mobile phone 100 may further include at least one sensor 350, such as a light sensor, a motion sensor, or another sensor. Specifically, the light sensor may include an ambient light sensor and a proximity sensor. The ambient light sensor can adjust luminance of the display panel 341 based on intensity of ambient light. The optical proximity sensor is disposed on the front face of the mobile phone 100. When the mobile phone 100 comes near an ear, the mobile phone 100 turns off a power supply of the display panel 341 based on detection of the optical proximity sensor 352. In this way, the mobile phone 100 can further save electricity. As a type of motion sensor, an accelerometer sensor can detect magnitudes of acceleration in various directions (which are usually three axes j, can detect, in a still state, a magnitude and a direction of gravity, and may be used for an application that identifies a mobile phone posture (for example, screen switching between a portrait mode and a landscape mode, a related game, and magnetometer posture calibration), a vibration-identification-related function (for example, a pedometer or tapping), and the like. For other sensors that may be further configured for the mobile phone 100, such as a gyroscope, a barometer, a hygrometer, a thermometer, and an infrared sensor, details are not described herein.

The audio frequency circuit 360, a loudspeaker 361, and a microphone 362 can provide an audio interface between the user and the mobile phone 100. The audio frequency circuit 360 may transmit, to the loudspeaker 361, an electrical signal converted from received audio data. The loudspeaker 361 converts the electrical signal into a sound signal and outputs the sound signal. In addition, the microphone 362 converts a collected sound signal into an electrical signal, and the audio frequency circuit 360 receives the electrical signal, converts the electrical signal into audio data, and then outputs the audio data to the RF circuit 310 to send the audio data to, for example, another mobile phone, or outputs the audio data to the memory 320 for further processing.

Wi-Fi belongs to a short-distance wireless transmission technology. The mobile phone 100 can connect to a home wireless local area network by using the Wi-Fi module 370, thereby helping the user receive and send an email, browse a web page, access streaming media, and the like. The Wi-Fi module 370 provides wireless broadband Internet access for the user.

The processor 380 is a control center of the mobile phone 100. The processor 380 is connected to all the parts of the entire mobile phone by using various interfaces and lines, and performs various functions of the mobile phone 100 and data processing by running or executing the software program stored in the memory 320 and by invoking the data stored in the memory 320, so as to monitor the entire mobile phone. In some embodiments, the processor 380 may include one or more processing units, or an application processor and a modem processor may be integrated into the processor 380. The application processor mainly processes an operating system, a user interface, an application program, and the like. The modem processor mainly processes wireless communication. It can be understood that, alternatively, the modem processor may not be integrated into the processor 380.

A Bluetooth module 381 is configured to exchange information with another device by using Bluetooth, a short-distance communications protocol. For example, the mobile phone 100 may establish, by using the Bluetooth module 381, a Bluetooth connection to a wearable electronic device (for example, a smartwatch) that also has a Bluetooth module, so as to exchange data.

The mobile phone 100 further includes the power supply 390 (such as a battery) that supplies power to all the parts. The power supply may be logically connected to the processor 380 by using a power management system, thereby implementing functions such as charge management, discharge management, and power consumption management by using the power management system. It can be understood that in the following embodiments, the power supply 390 may be configured to supply power to the display panel 341 and the touch control panel 331.

All methods in the following embodiments may be implemented in the mobile phone 100 that has the foregoing hardware structure.

Figure 4:
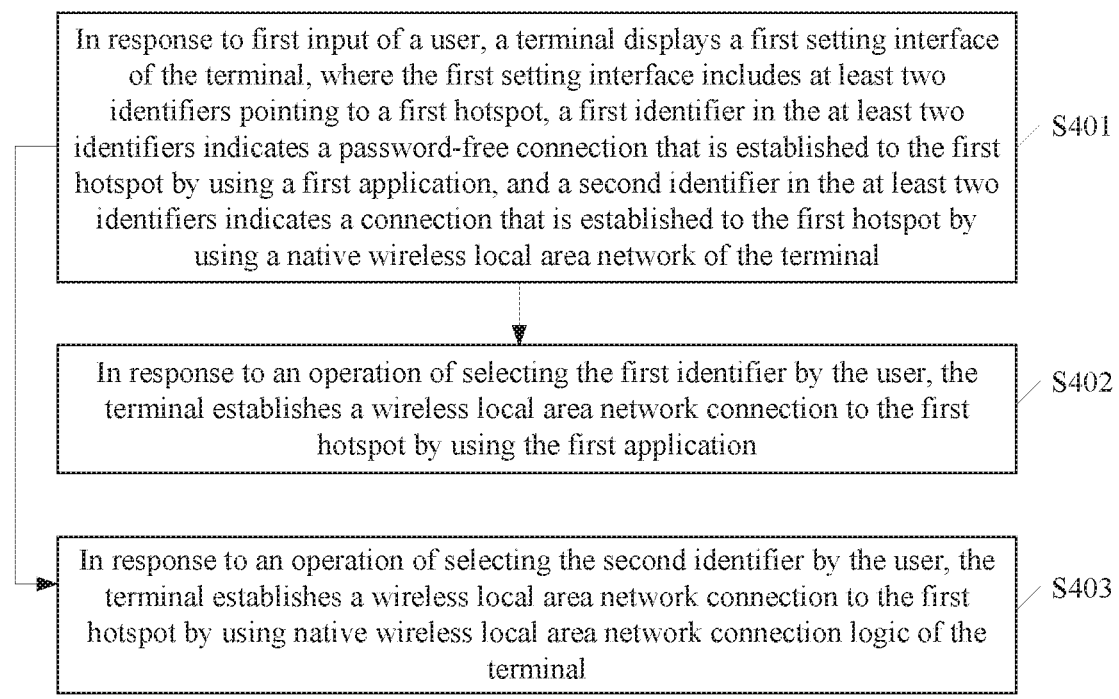
FIG. 4 is a first flowchart of a method for establishing a wireless local area network connection according to this application.

This application provides a method for establishing a wireless local area network connection. The method may be applied to a process of establishing, by a terminal, a wireless local area network connection to a Wi-Fi hotspot. As shown in FIG. 4, the method for establishing a wireless local area network connection includes S401 to S403.

S401: In response to first input of a user, a terminal displays a first setting interface of the terminal, where the first setting interface includes at least two link identifiers pointing to a first hotspot, a first link identifier in the at least two link identifiers indicates a password-free connection that is established to the first hotspot by using a first application, and a second link identifier in the at least two link identifiers indicates a connection that is established to the first hotspot by using a native wireless local area network of the terminal.

Figure 5:
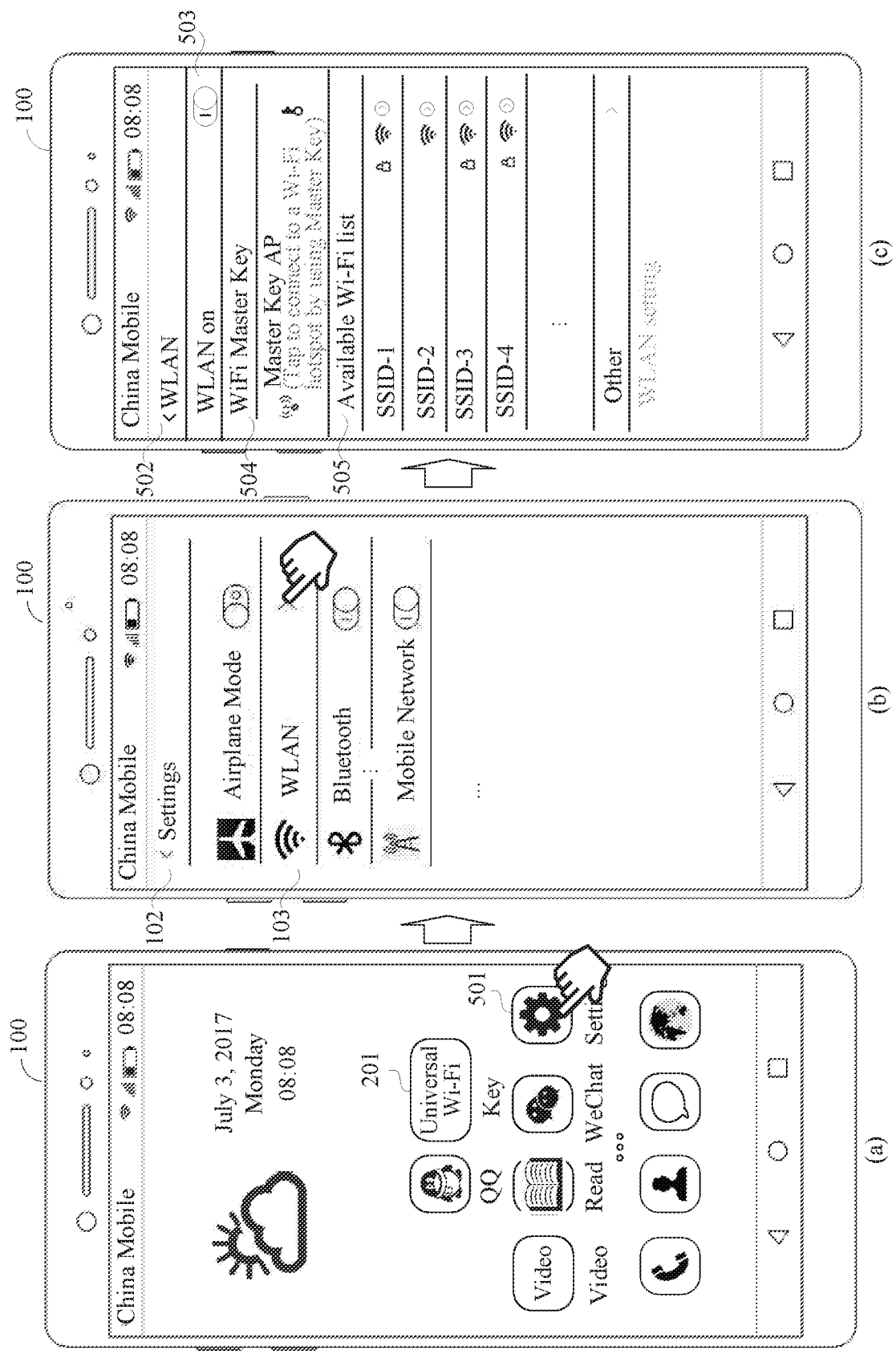
FIG. 5 is a first schematic diagram of a display interface of a terminal according to this application.
Figure 6:
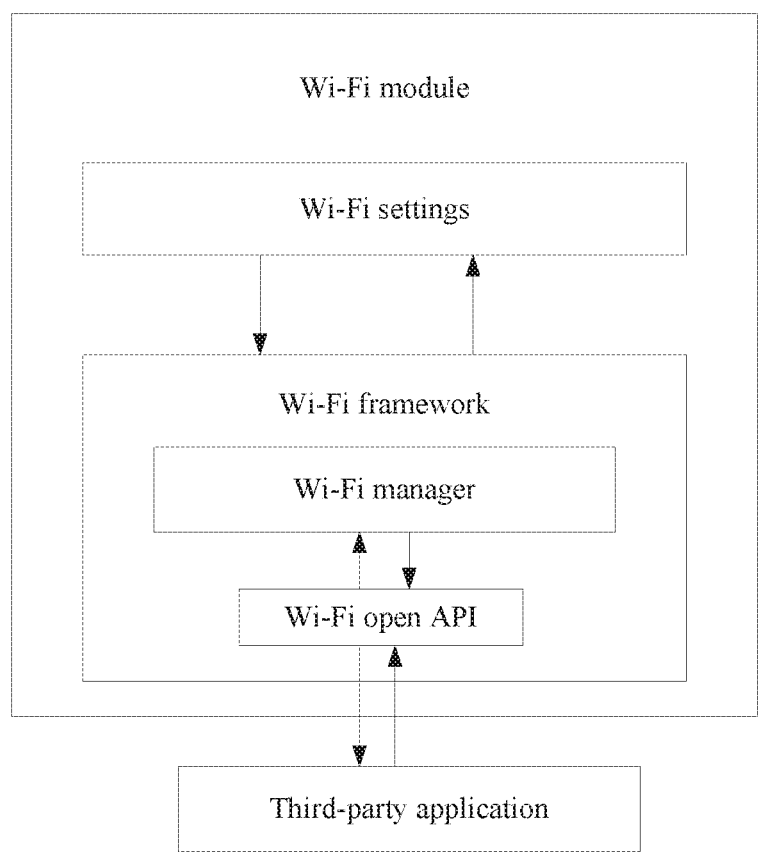
FIG. 6 is a schematic architectural diagram of a Wi-Fi module according to this application.

For example, based on the Wi-Fi network architecture shown in FIG. 1 or FIG. 2, the mobile phone 100 is used as an example of the terminal. As shown in FIG. 5(a), an application program "Universal Wi-Fi" 201 (that is, the first application) is installed on the mobile phone 100. After a finger of a user taps a "Settings" application icon 501 on a terminal screen of the mobile phone 100 shown in FIG. 5(a), the mobile phone 100 may display a "setting interface" 102 shown in FIG. 5(b). The "setting interface" 102 shown in FIG. 5(b) includes function options such as an "Airplane Mode" option, a "WLAN" option 103, a "Bluetooth" option, and a "Mobile Network" option. After the finger of the user taps the "WLAN" option 103 in FIG. 5(b), the mobile phone 100 may display a "Wi-Fi setting interface" 502 (that is, the first setting interface) shown in FIG. 5(c).

A prior-art "Wi-Fi setting interface" (such as the "Wi-Fi setting interface" 104 shown in FIG. 1(c)) usually includes only a "wireless local area network switch" option 105 and a "native Wi-Fi list" (that is, an SSID list) of the mobile phone 100. To be specific, the prior-art "Wi-Fi setting interface" includes only a link identifier that points to the first hotspot (any Wi-Fi hotspot) and that is for establishing a connection to the first hotspot by using the native wireless local area network of the terminal. The link identifier indicates the connection that is established to the first hotspot by using the native wireless local area network of the terminal. However, the "Wi-Fi setting interface" of the terminal in this application not only includes the "native list" of the terminal, but also includes a connection (list) (for example, a "Wi-Fi Master Key interface") provided by the first application on the terminal. For example, the "Wi-Fi setting interface" 502 shown in FIG. 5(c) not only includes a "native Wi-Fi list" 505 of the mobile phone 100, but also includes a "Wi-Fi Master Key option" 504. To be specific, the "Wi-Fi setting interface" (that is, the first setting interface) in this application includes the at least two link identifiers pointing to the first hotspot, the first link identifier in the at least two link identifiers indicates the password-free connection that is established to the first hotspot by using the first application, and the second link identifier in the at least two link identifiers indicates the connection that is established to the first hotspot by using the native wireless local area network of the terminal. For example, the first link identifier may be the "Wi-Fi Master Key option" 504 shown in FIG. 5(c), and the second identifier may be any SSID in the "native Wi-Fi list" 505 shown in FIG. 5(c).

It should be noted that the second link identifier displayed in the first setting interface (that is, the Wi-Fi setting interface of the terminal) displayed by the terminal in this application is not affected by the first link identifier. To be specific, regardless of whether the Wi-Fi setting interface of the terminal displays a password-free connection established by using the first application, an SSID that is displayed in the Wi-Fi setting interface and that is searched out by the terminal by using native wireless local area network connection logic of the terminal does not change. For example, the SSIDs displayed in the Wi-Fi setting interface 104 shown in FIG. 1(c) are the same as SSIDs in the "native Wi-Fi list" 505 in the Wi-Fi setting interface 502 shown in FIG. 5(c). In other words, this embodiment of the present invention provides different connection approaches to a same hotspot, for free selection by the user. This facilitates a user operation, and allows the user to establish a Wi-Fi connection more flexibly.

For detailed descriptions of the "native wireless local area network" in this application, refer to detailed descriptions in chapter 10.1.4 in the wireless network standard protocol 802.11std-2012. Details are not described herein in this application.

Usually, when the finger of the user taps the "WLAN" option displayed by the mobile phone 100 shown in FIG. 5(b), the mobile phone 100 may invoke Wi-Fi Manager.get Scan Results( ) in a Wi-Fi framework of the mobile phone 100 to search for a nearby wireless local area network signal, so as to obtain an SSID of a wireless local area network that can be searched out by the mobile phone 100. Then, the mobile phone 100 reports a search result to a Wi-Fi settings module, so that the Wi-Fi settings module displays the SSID of the searched-out wireless local area network, as shown in the display interface 104 shown in FIG. 1(c).

In this application, a Wi-Fi open application programming interface (Application Programming Interface, API) used to read Wi-Fi data from the first application is added to a Wi-Fi module of the terminal. In this application, when the finger of the user taps the "WLAN" option displayed by the mobile phone 100 shown in FIG. 5(b), the mobile phone 100 may not only invoke Wi-Fi Manager.get Scan Results( ) in the Wi-Fi framework of the mobile phone 100 to obtain the SSID of the wireless local area network that can be searched out by the mobile phone 100, but also invoke Wi-Fi Manager.get Scan Results( ) to obtain Wi-Fi data (for example, information about a Wi-Fi hotspot that can be searched out by the first application, such as a wireless local area network SSID and a Wi-Fi password) from the first application by using the Wi-Fi open API. Then, the mobile phone 100 may report, to the Wi-Fi settings module, the SSID of the searched-out wireless local area network and the Wi-Fi data that is obtained from the first application, so that the Wi-Fi settings module displays the SSID of the searched-out wireless local area network and the Wi-Fi data that is obtained from the first application, as shown in the display interface 502 shown in FIG. 5(c).

S402: In response to an operation of selecting the first link identifier by the user, the terminal establishes a wireless local area network connection to the first hotspot by using the first application.

For example, when the user taps the "Wi-Fi Master Key option" 504 shown in FIG. 5(c), the mobile phone 100 may establish a wireless local area network connection to a corresponding Wi-Fi hotspot by using the first application.

It can be understood that the first application may search out signals of more than one wireless local area network, and therefore, the first link identifier may be displayed in a first link set. The first link set is a set including at least one hotspot to which a password-free connection can be established by using the first application. In this way, the terminal may establish, in response to the operation of selecting the first link identifier by the user, a wireless local area network connection to any hotspot in the first link set by using the first application.

Optionally, the first link identifier may be a hotspot whose signal strength is highest in the first link set. Specifically, S402 may be replaced by S402a and S402b.

S402a: In response to the operation of selecting the first link identifier by the user, the terminal selects, from the first link set, a hotspot that is searched out by the first application and whose signal strength is highest.

For example, the signal strength in this application may be received signal strength (Received Signal Strength Indicator, RSSI).

S402b: The terminal establishes, by using the first application, the wireless local area network connection to the hotspot whose signal strength is highest.

The terminal may compare signal strength of at least one hotspot searched out by the first application, and establish, by using the first application, the wireless local area network connection to the hotspot whose signal strength is highest.

Optionally, after the terminal establishes, by using the first application, the wireless local area network connection to the hotspot whose signal strength is highest, the terminal may further display a display interface (which is not shown in a figure of this specification) that includes the following prompt information: "Your terminal has accessed a wireless local area network hotspot whose connection signal strength is highest".

It should be noted that signal strength of a hotspot of a wireless local area network in this application is detected signal strength of the wireless local area network. In other words, the signal strength is received signal strength, at the terminal, of a signal of the wireless local area network, rather than transmitted signal strength of the hotspot of the wireless local area network.

In this application, for a method for "establishing, by the terminal, the wireless local area network connection to the first hotspot by using the first application", reference may be made to a prior-art method for establishing a wireless local area network connection to a hotspot by using an application program such as Wi-Fi Master Key, Skytone, or a free Wi-Fi Internet access assistant. Details are not described herein in this application.

S403: In response to an operation of selecting the second link identifier by the user, the terminal establishes a wireless local area network connection to the first hotspot by using native wireless local area network connection logic of the terminal.

For example, when the user taps any SSID option in the "native Wi-Fi list" 505 shown in FIG. 5(c), the terminal may establish, by using the native wireless local area network connection logic of the terminal, a wireless local area network connection to a wireless local area network AP corresponding to the SSID selected by the user.

It should be noted that, for a method for "establishing, by the terminal, the wireless local area network connection by using the native wireless local area network connection logic of the terminal" in this application, reference may be made to detailed descriptions of a method for "establishing, by a terminal, a wireless local area network connection by using native wireless local area network connection logic of the terminal" in the prior art. Details are not described herein in this application.

According to the method for establishing a wireless local area network connection provided in this application, the terminal may display, in the first setting interface (that is, a native Wi-Fi setting interface of the terminal), both the password-free connection that is performed by the first application and the native wireless local area network connection of the terminal, where the two connections both point to the first hotspot. In this way, the user can select "establishing the wireless local area network connection by using the native wireless local area network connection logic of the terminal" or "establishing the wireless local area network connection by using the first application" based on preference or a requirement of the user. Therefore, frequent switching between the native Wi-Fi setting interface of the terminal and a Wi-Fi interface of the first application due to different user requirements can be avoided, and user experience when the user controls the terminal to connect to a Wi-Fi hotspot can be improved.

Figure 7:
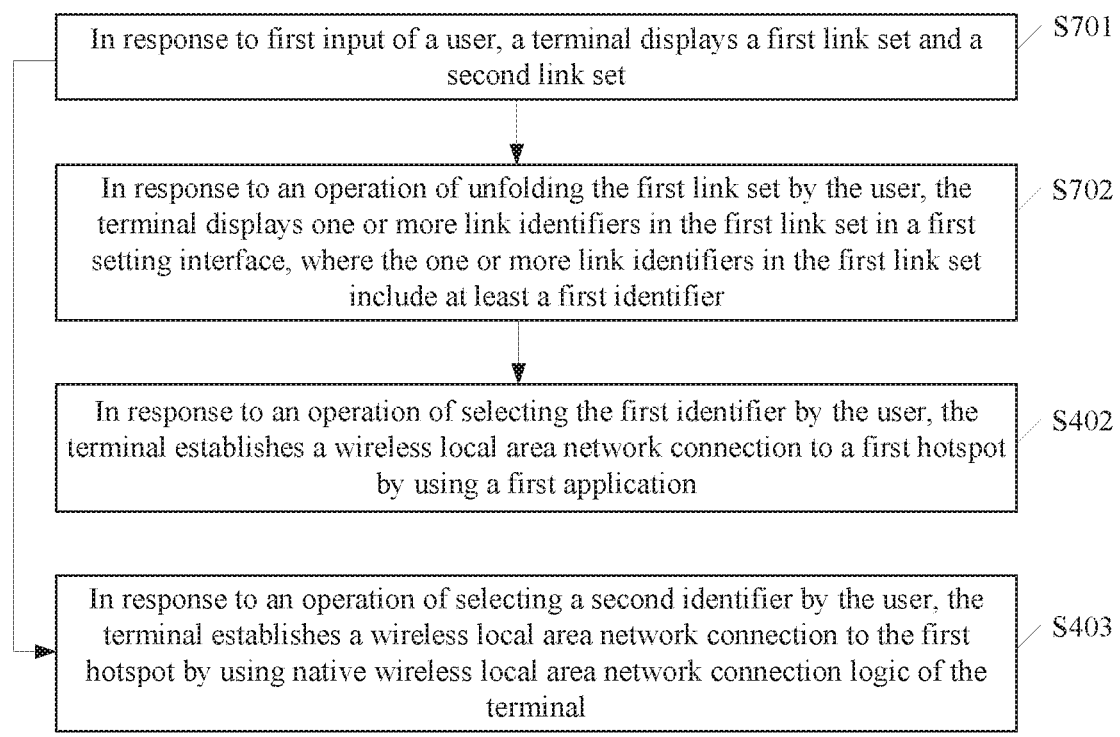
FIG. 7 is a second flowchart of a method for establishing a wireless local area network connection according to this application.

Further, the first link identifier is displayed in the first link set, and the first link set is the set including one or more hotspots to which a password-free connection can be established by using the first application. However, the user may expect to control the terminal to access, by using the first application, a wireless local area network corresponding to a hotspot specified by the user, instead of accessing a wireless local area network corresponding to a hotspot that is randomly selected by the terminal from the first link set or that is selected by the terminal from the first link set based on signal strength. In this case, as shown in FIG. 7, S401 shown in FIG. 4 may include S701 and S702.

S701: In response to the first input of the user, the terminal displays the first link set and the second link set.

The second link identifier may be displayed in the second link set, and the second link set includes a set of hotspots to which a connection can be established by using the native wireless local area network of the terminal.

S702: In response to an operation of unfolding the first link set by the user, the terminal displays one or more link identifiers in the first link set in the first setting interface, where the one or more link identifiers in the first link set include at least the first link identifier.

Figure 8:
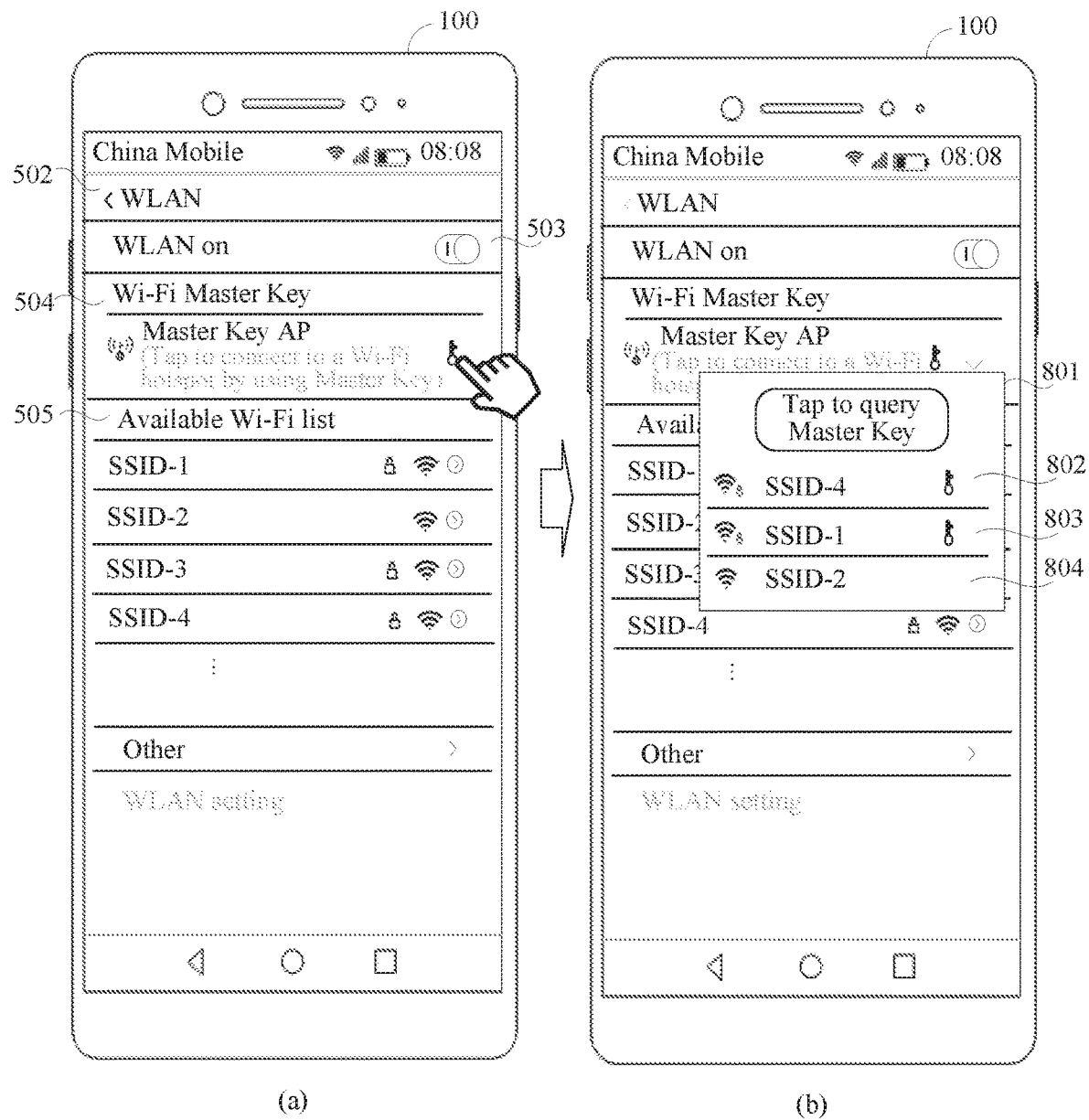
FIG. 8 is a second schematic diagram of a display interface of a terminal according to this application.

For example, the second link set may be a "native Wi-Fi list" 505 shown in FIG. 8(a), and the second identifier may be any SSID in the "native Wi-Fi list" 505 shown in FIG. 5(c). When the user taps a "Wi-Fi Master Key option" 504 shown in FIG. 8(a), the mobile phone 100 may display a display interface shown in FIG. 8(b). The display interface shown in FIG. 8(b) includes an SSID list 801 of wireless local area networks that can be connected to without a password and that are searched out by the first application. The first link set may be the wireless local area network SSID list 801 shown in FIG. (b). An "SSID-1" included in the wireless local area network SSID list 801 (that is, the first link set) shown. In FIG. (b) may be the first link identifier pointing to the first hotspot. An "SSID-1" included in the "native Wi-Fi list" 505 (that is, the second link set) shown in FIG. 5(c) may be the second link identifier pointing to the first hotspot.

When the user taps any SSID option (such as an SSID-4 option 802) in the SSID list 801 shown in FIG. 8(b), the mobile phone 100 may establish a wireless local area network connection to a corresponding Wi-Fi hotspot (that is, an AP-4) by using the first application.

It should be noted that a wireless local area network that can be connected to without a password, that is, a password-free Wi-Fi hotspot, may include an operator-provided free Wi-Fi hotspot, a merchant-provided free Wi-Fi hotspot, a shared Wi-Fi hotspot, a Wi-Fi hotspot without a password, and an encrypted Wi-Fi hotspot with a password cracked by the first application. Regardless of whether a Wi-Fi password is set for these Wi-Fi hotspots, because these hotspots are Wi-Fi hotspots that can be connected to without a password and that are searched out by the terminal by using the first application, the user can directly access these hotspots by using the first application, with no need to input a Wi-Fi password any longer.

Further, Wi-Fi password complexity varies between the wireless local area networks, and therefore, the first application (for example, "Universal Wi-Fi") possibly can decrypt only wireless local area networks corresponding to some of the SSIDs. For example, it is assumed that the application program "Universal Wi-Fi" on the mobile phone 100 can decrypt a wireless local area network corresponding to an "SSID-4" and a wireless local area network corresponding to the "SSID-1", but cannot decrypt a wireless local area network corresponding to an "SSID-3".

Figure 9:
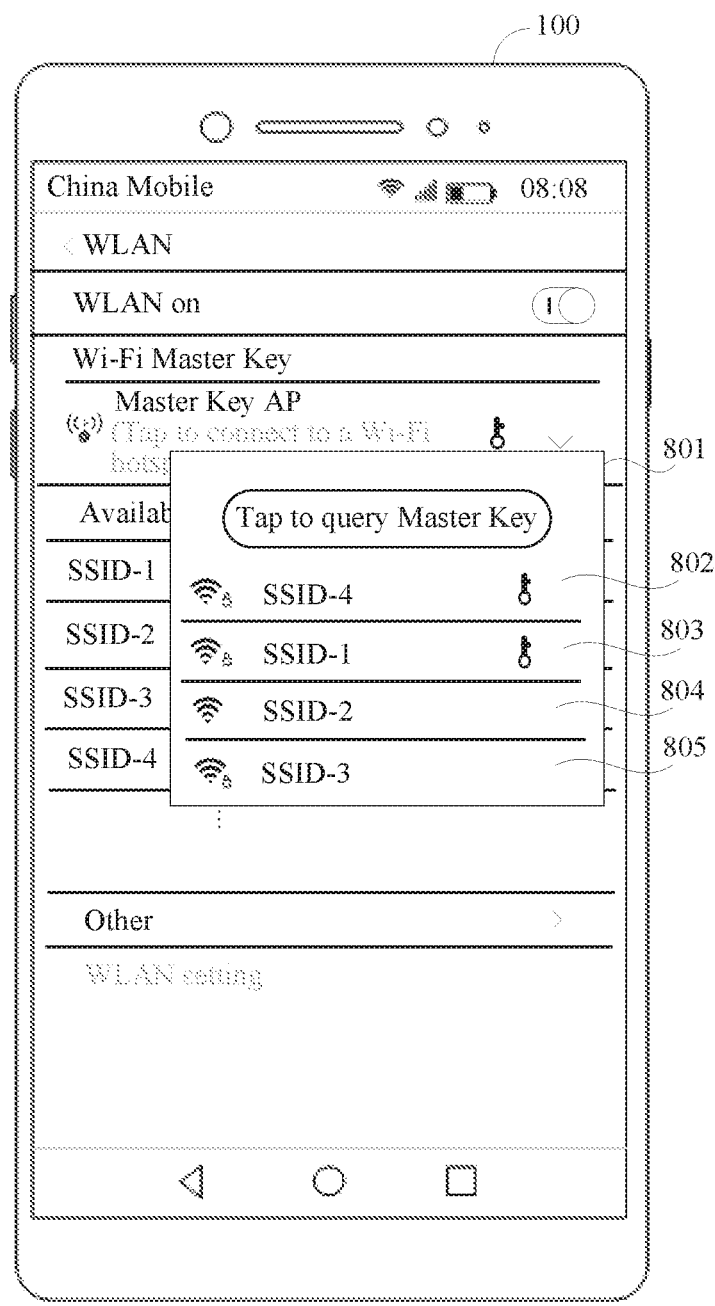
FIG. 9 is a third schematic diagram of a display interface of a terminal according to this application.

As shown in FIG. 9, the first link set (such as the wireless local area network SSID list 801) may include an SSID option of a wireless local area network already decrypted by the first application (such as the SSID-4 option 802 and an SSID-1 option 803) and an SSID of an unencrypted wireless local area network (such as an SSID-2 option 804), and may also include an SSID option of a wireless local area network that is not successfully decrypted by the first application (such as an SSID-3 option 805).

Further, the terminal may alternatively directly display, in response to the first input of the user, the display interface including the SID list 801 shown in FIG. 8(b), instead of displaying a display interface shown in FIG. 8(a) and then directly displaying, in response to an operation of the user, the display interface including the SSID list 801 shown in FIG. 8(b).

Figure 10:
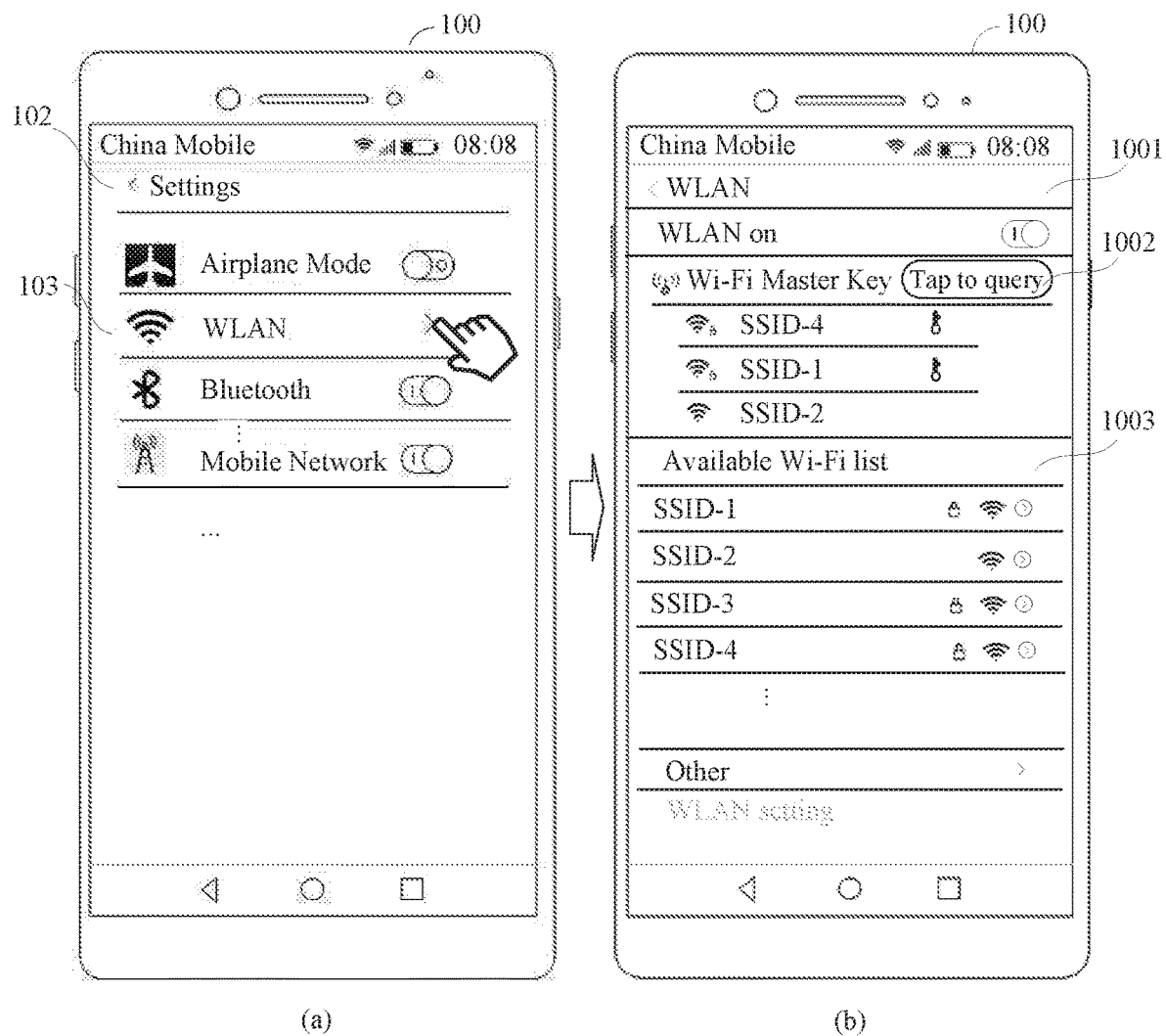
FIG. 10 is a fourth schematic diagram of a display interface of a terminal according to this application.

For example, after the finger of the user taps a "WLAN" option 103 in FIG. 10(a), the mobile phone 100 may display a "Wi-Fi setting interface" 1001 shown in FIG. 10(b). The "Wi-Fi setting interface" 1001 shown in FIG. 10(b) may include a "native Wi-Fi list" 1003 of the mobile phone 100 and an SSID list 1002 of wireless local area networks corresponding to the first link set.

According to the method for establishing a wireless local area network connection provided in this application, the terminal may further display the SSID list of the wireless local area networks that are corresponding to the first link set (that is, searched out by the first application) and that can be connected to without a password. In this way, the user can select, from the SSID list, an SSID of a wireless local area network that the user expects to access, so that the terminal can establish, by using the first application, a wireless local area network connection to the wireless local area network selected by the user.

Figure 11:
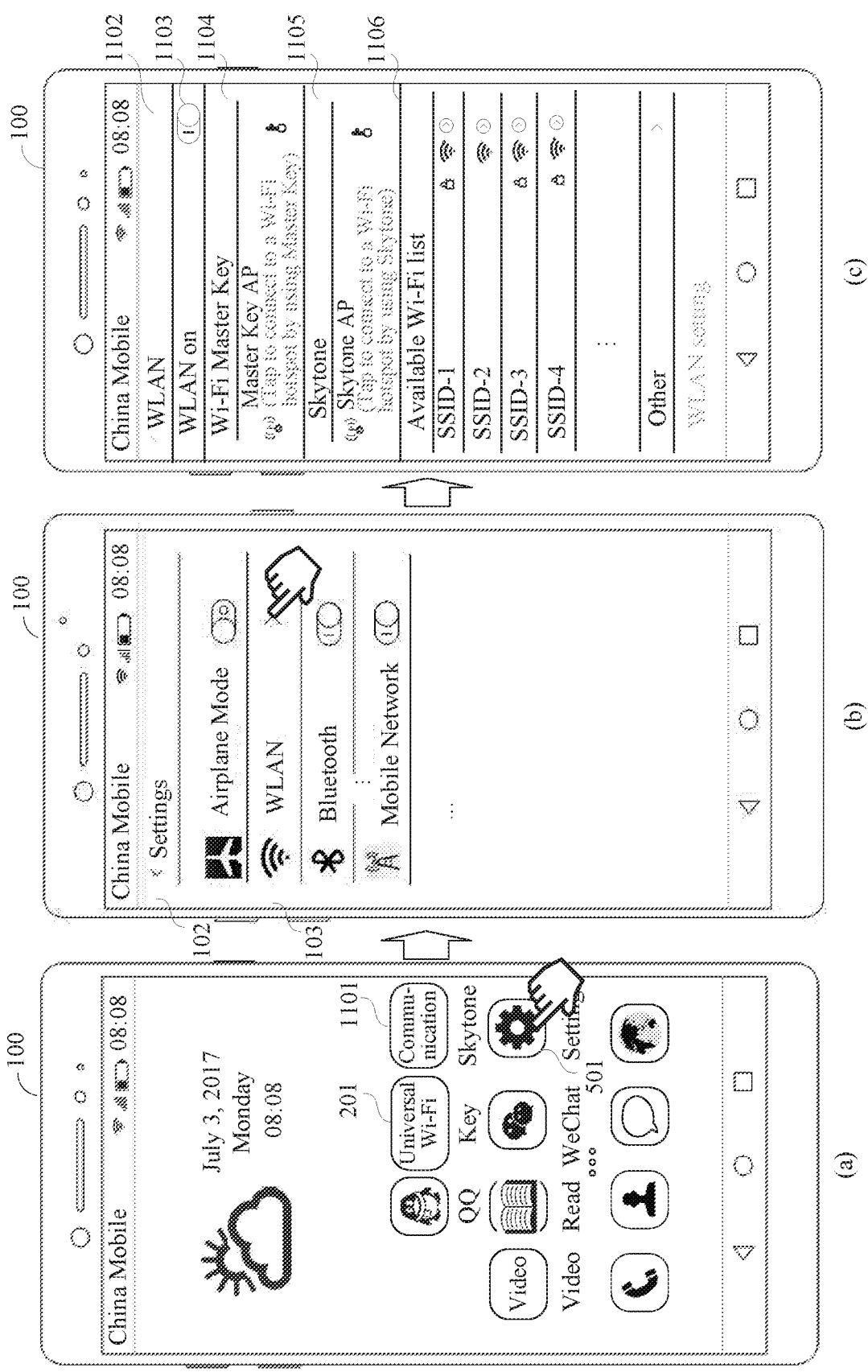
FIG. 11 is a fifth schematic diagram of a display interface of a terminal according to this application.

Further, more than one first application used for wireless local area network connection may be installed on the terminal. For example, as shown in FIG. 11(a), a first application "Universal Wi-Fi" 201 and a second application "Skytone" 1101 may be installed on the mobile phone 100. In this case, the terminal may display, in response to an operation performed by the user on a link identifier of the first connection, an SSID of a wireless local area network searched out by each of at least two first applications.

For example, after the finger of the user taps a "Settings" application icon 501 on a terminal screen of the mobile phone 100 shown in FIG. 11(a), the mobile phone 100 may display a "setting interface" 102 shown in FIG. 11(b). The "setting interface" 102 shown in FIG. 11(b) is the same as the "setting interface" 102 shown in FIG. 5(b). After the finger of the user taps a "WLAN" option 103 in FIG. 11(b), the mobile phone 100 may display a "Wi-Fi setting interface" 1102 shown in FIG. 11(c). The "Wi-Fi setting interface" 1102 shown in FIG. 11(c) may not only include a "native Wi-Fi list" 1106 of the mobile phone 100, but also include a "Wi-Fi Master Key option" 1104 and a "Skytone option" 1105.

Figure 12:
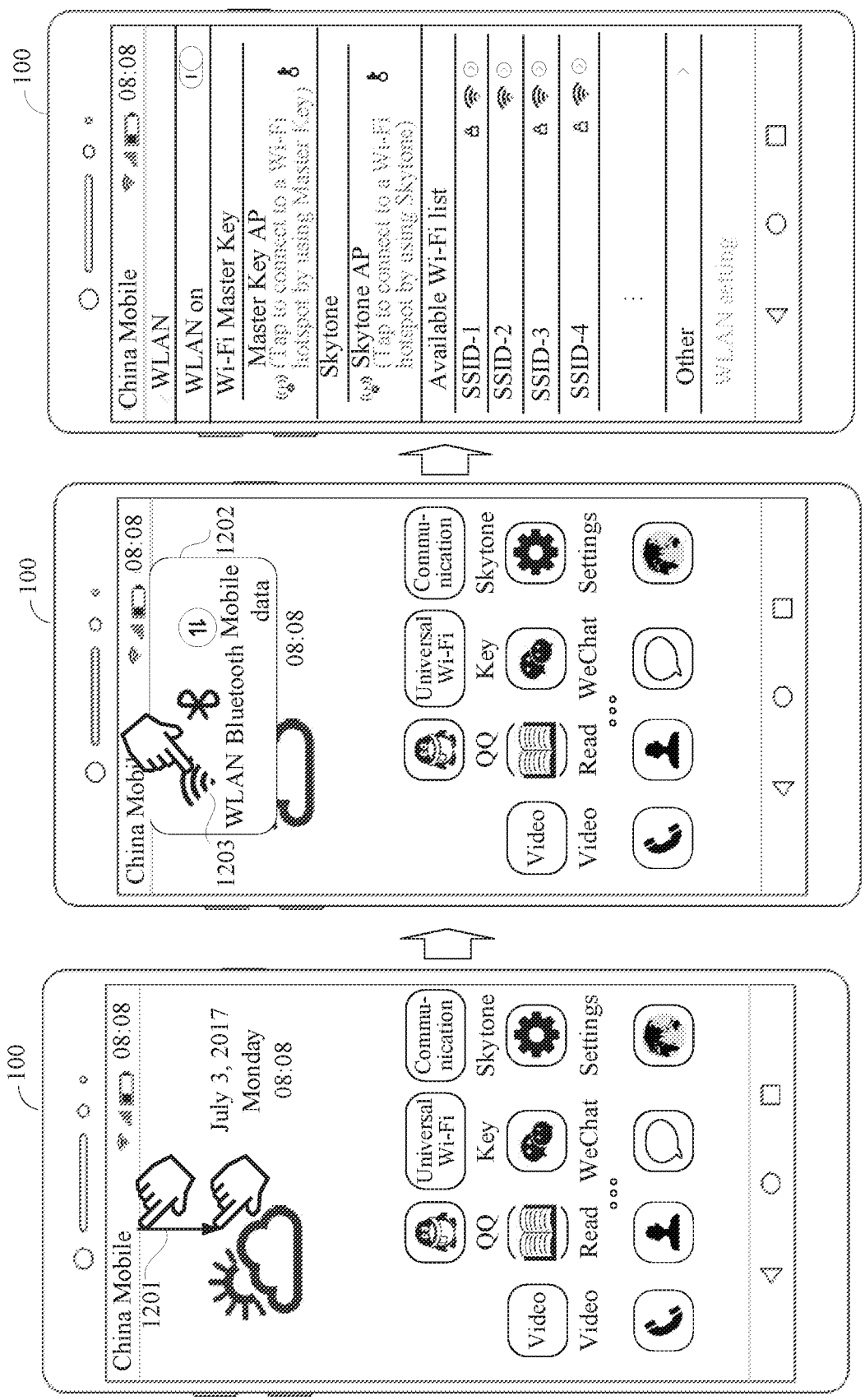
FIG. 12 is a sixth schematic diagram of a display interface of a terminal according to this application.

As shown in FIG. 12(a), when the finger of the user slides on a display screen of the mobile phone 100 along a sliding track 1201 shown in FIG. 12(a), the mobile phone 100 may display a drop-down list 1202 shown in FIG. 12(b). The drop-down list 1202 includes a "WLAN option" 1203, a "Bluetooth option", a "Mobile Data option", and the like. The "WLAN option" 1203 may be used to control the mobile phone 100 to enable or disable a wireless communication function of the mobile phone 100, and display a "Wi-Fi setting interface" of the mobile phone 100. For example, when tapping the "WLAN option" 1203, the user may control the mobile phone 100 to enable or disable the wireless communication function of the mobile phone 100; when the user touches and holds the "WLAN option" 1203, the mobile phone 100 may display the "Wi-Fi setting interface" shown in FIG. 12(c).

Figure 13:
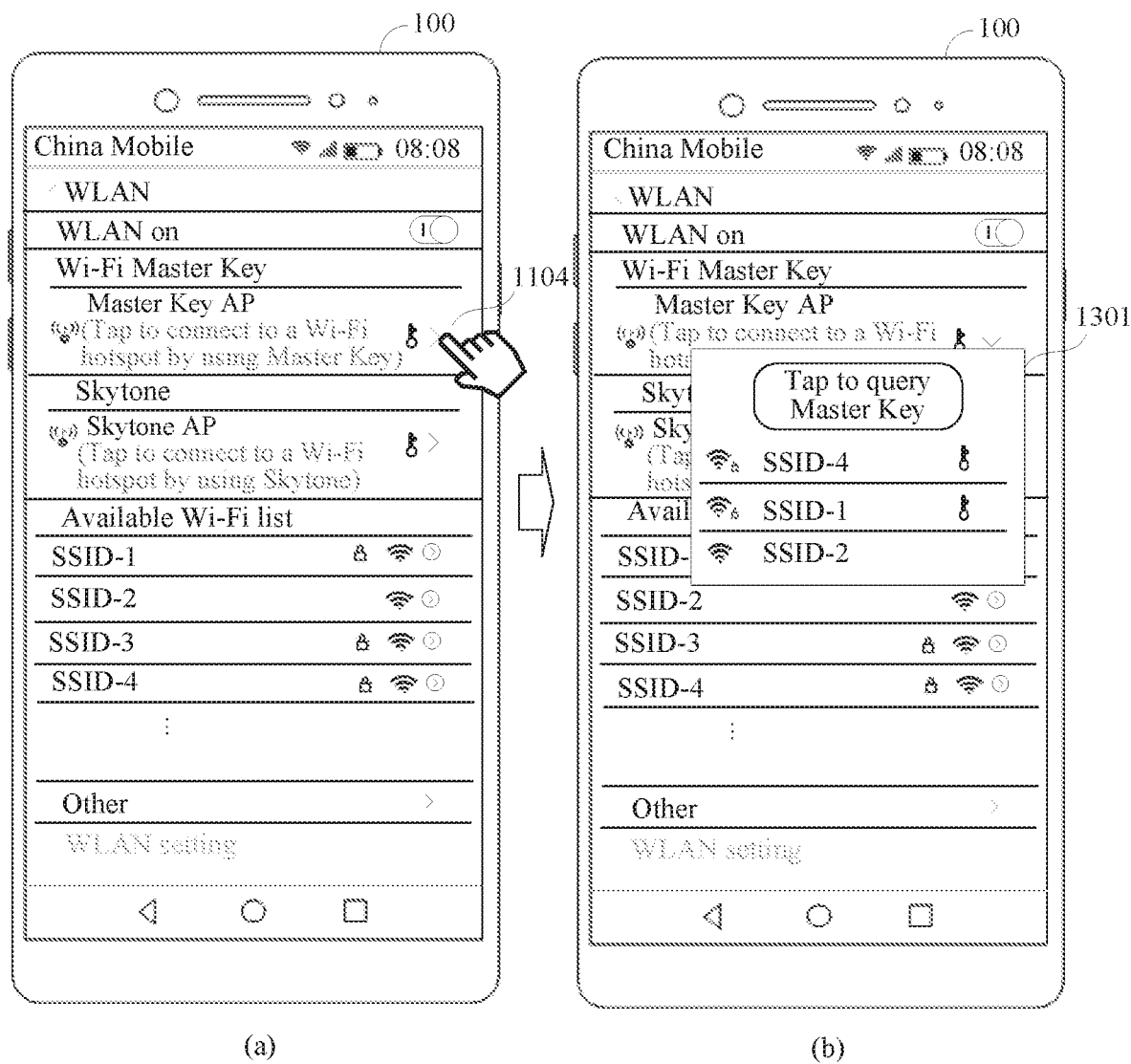
FIG. 13 is a seventh schematic diagram of a display interface of a terminal according to this application.

It can be understood that when the user taps a "Wi-Fi Master Key option" 1104 shown in FIG. 13(a), the mobile phone 100 may display a display interface including an SSID list 1301 of wireless local area networks corresponding to the first link set.

Further, the terminal may alternatively directly display, in response to the operation of selecting the first link identifier by the user, the display interface including the SID list 1301 shown in FIG. 13(b), instead of displaying a display interface shown in FIG. 13(a) and then directly displaying, in response to an operation of the user, the display interface including the SID list 1301 shown in FIG. 13(b).

Figure 14:
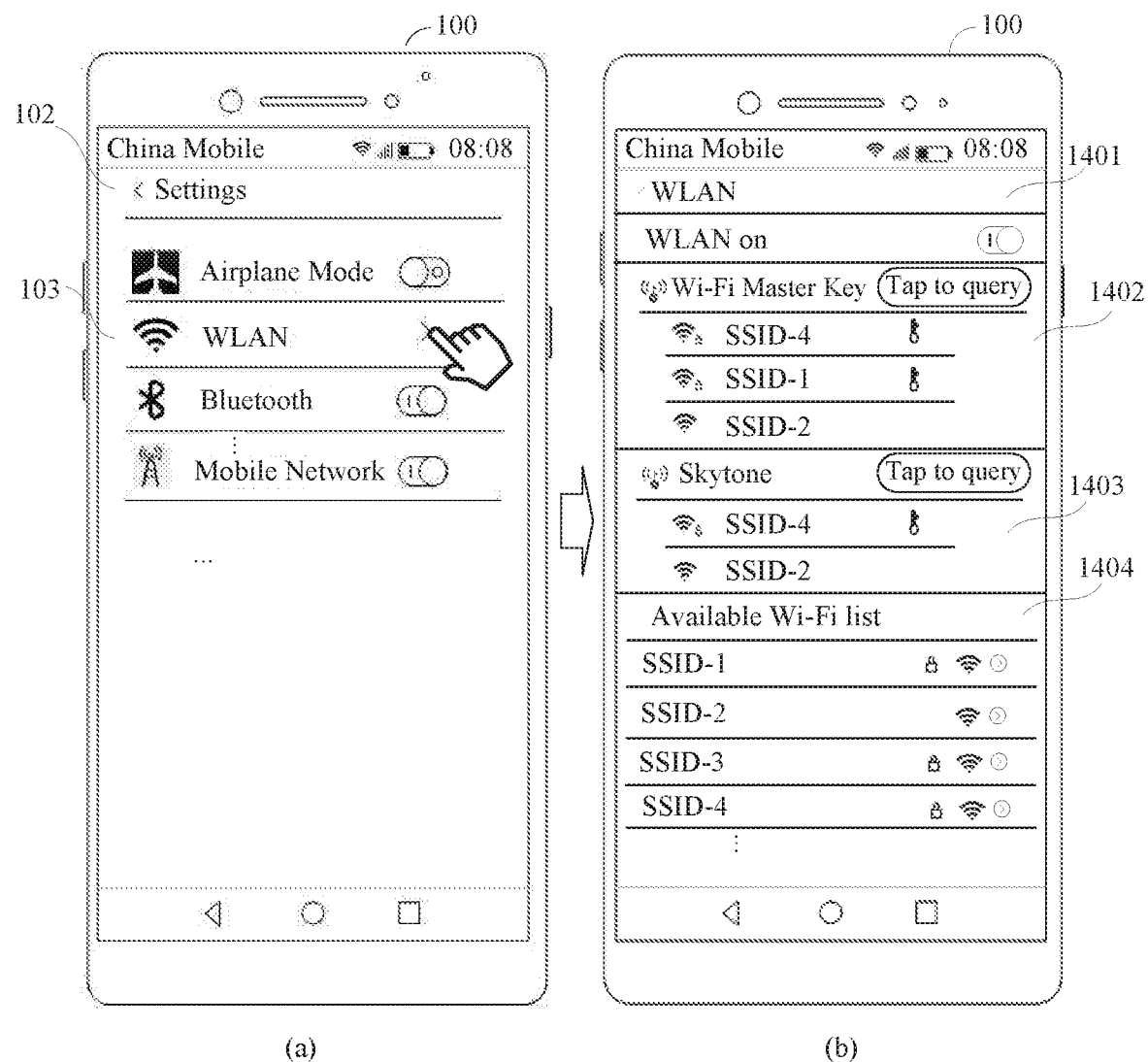
FIG. 14 is an eighth schematic diagram of a display interface of a terminal according to this application.

For example, after the finger of the user taps a "WLAN" option 103 in FIG. 14(a), the mobile phone 100 may display a "Wi-Fi setting interface" 1401 shown in FIG. 14(b). The "Wi-Fi setting interface" 1401 shown in FIG. 14(b) may include a "native Wi-Fi list" 1404 of the mobile phone 100, an SSID list 1402 of wireless local area networks that can be connected to without a password and that are searched out by "Universal Wi-Fi", and an SSID list 1403 of wireless local area networks that can be connected to without a password and that are searched out by "Skytone".

Wireless local area network Wi-Fi password cracking capabilities of different first applications are different. Therefore, SSID options in SSID lists of wireless local area networks that can be connected to without a password and that are searched out by different first applications may be different. For example, SSID options included in the SSID list 1402 of the wireless local area networks that can be connected to without a password and that are searched out by "Universal Wi-Fi" are different from those included in the SSID list 1403 of the wireless local area networks that can be connected to without a password and that are searched out by "Skytone".

Figure 15:
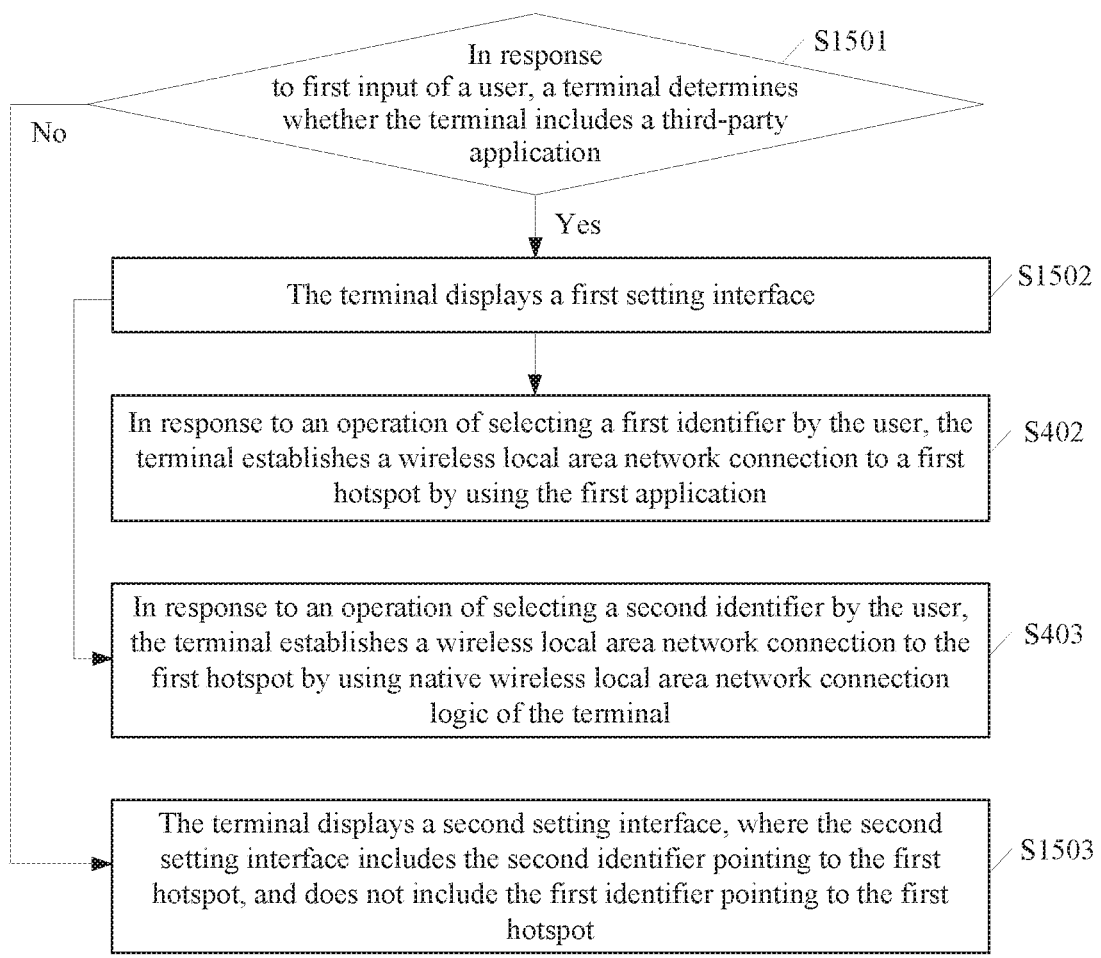
FIG. 15 is a third flowchart of a method for establishing a wireless local area network connection according to this application.

Further, before displaying the first setting interface, the terminal may first determine whether the terminal includes the first application. When the terminal includes the first application, the terminal may display the first setting interface. Specifically, S401 may include S1501 and S1502. For example, as shown in FIG. 15, S401 shown in FIG. 4 may include S1501 and S1502.

S1501: In response to the first input of the user, the terminal determines whether the terminal includes the first application.

When the terminal includes the first application, the terminal may continue to perform S1502. When the terminal does not include the first application, the terminal may continue to perform S1503.

S1502: The terminal displays the first setting interface.

S1503: The terminal displays a second setting interface, where the second setting interface includes the second identifier pointing to the first hotspot, and does not include the first link identifier pointing to the first hotspot.

It should be noted that, for detailed descriptions of the second setting interface herein in this application, reference may be made to detailed descriptions of the display interface shown in FIG. 1(b) in this application, and details are not described herein in this application again. In addition, after S1504, the terminal may establish a wireless local area network connection by using the native wireless local area network connection logic of the terminal, in response to an operation of choosing, by the user, to establish a wireless local area network connection by using the second link. In this case, the terminal may continue to perform S403.

According to the method for establishing a wireless local area network connection provided in this application, the terminal may display, in the first setting interface (that is, a native setting interface of the terminal), both the password-free connection that is performed by the first application and the native wireless local area network connection of the terminal, where the two connections both point to the first hotspot. In this way, the user can select "establishing the wireless local area network connection by using the native wireless local area network connection logic of the terminal" or "establishing the wireless local area network connection by using the first application" based on preference or a requirement of the user. Therefore, frequent switching between the native Wi-Fi setting interface of the terminal and a Wi-Fi interface of the first application due to different user requirements can be avoided, and user experience when the user controls the terminal to connect to a Wi-Fi hotspot can be improved.

The foregoing describes the solutions provided in the embodiments of this application mainly from a perspective that the terminal displays the Wi-Fi interface and establishes, in response to the input performed by the user in the Wi-Fi interface, the wireless local area network connection to the Wi-Fi hotspot. It can be understood that, to implement the foregoing functions, the terminal includes corresponding function modules for performing all the functions. A person skilled in the art should be easily aware that, in this application, terminals and algorithm steps in examples described with reference to the embodiments disclosed in this specification may be implemented by hardware or a combination of hardware and computer software. Whether a function is performed by hardware or computer software driving hardware depends on a particular application and a design constraint of the technical solution. A person skilled in the art may use different methods to implement the described functions for each specific application, but it should not be considered that such an implementation goes beyond the scope of this application.

The embodiments of this application provide a terminal for implementing the foregoing method embodiments. Specifically, the terminal may be divided based on the foregoing method examples. For example, each module or unit may be corresponding to one function. Alternatively, two or more functions may be integrated to one processing module. The integrated module may be implemented in a form of hardware, or may be implemented in a form of a software module or unit. Module or unit division in the embodiments of this application is an example, and is merely logical function division. In actual implementation, there may be another division manner.

Figure 16:
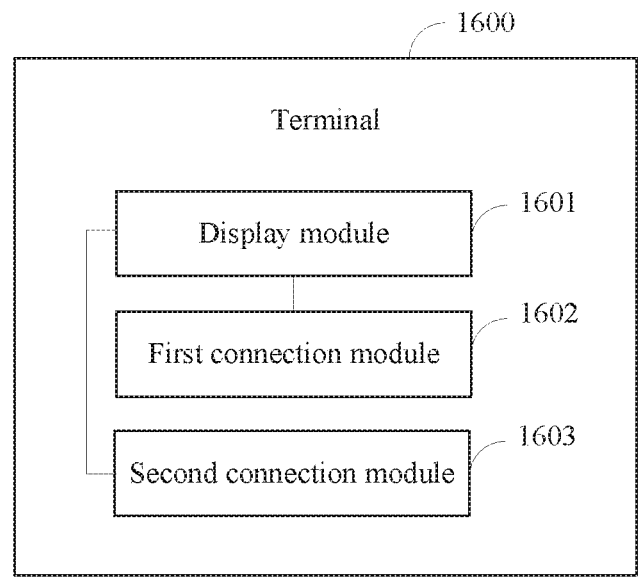
FIG. 16 is a first schematic diagram of structural composition of a terminal according to this application.

FIG. 16 is a possible schematic structural diagram of a terminal in the foregoing embodiments. In a first application scenario of this embodiment of the present invention, as shown in FIG. 16, the terminal 1600 may include a display module 1601, a first connection module 1602, and a second connection module 1603.

The display module 1601 is configured to support S401, S1502, S1503, S701, and S702 in the method embodiments, and/or another process used for the technology described in this specification. The first connection module 1602 is configured to support S402, S402a, and S402b in the method embodiments, and/or another process used for the technology described in this specification. The second connection module 1603 is configured to support S403 in the method embodiments, and/or another process used for the technology described in this specification.

Further, the terminal 1600 may further include a determining module. The determining module is configured to support S1501 in the method embodiments, and/or another process used for the technology described in this specification.

Certainly, the terminal 1600 includes but is not limited to the foregoing listed units and modules. For example, the terminal 1600 may further include a sending module configured to send data or a signal to another device, a receiving module configured to receive data or a signal sent by another device, and the like. Moreover, functions that can be specifically implemented by the foregoing modules include but are not limited to functions corresponding to the method steps in the foregoing embodiments. For detailed descriptions of another unit of the terminal 1600 and each unit of the terminal 1600, refer to detailed descriptions of corresponding method steps. Details are not described herein in this embodiment of this application again.

When an integrated unit is used, the first connection module 1602, the second connection module 1603, and the determining module may be integrated into one processing unit for implementation. The processing unit may be a processor or a controller, for example, may be a CPU, a graphics processing unit (Graphics Processing Unit, GPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware part, or any combination thereof. The processing unit can implement or execute various logical blocks, modules, and circuits that are described as examples with reference to content disclosed in this application. Alternatively, the processing unit may be a combination implementing a computing function, for example, a combination that includes one or more microprocessors or a combination of a DSP and a microprocessor. The storage module may be a memory.

Figure 17:
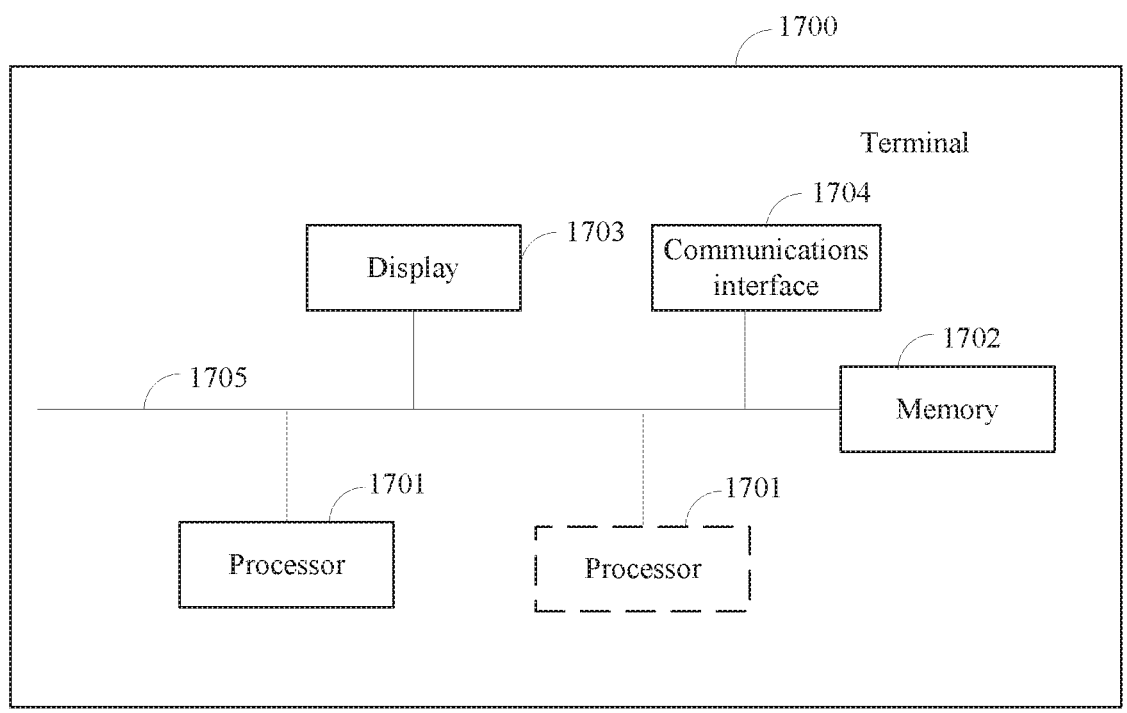
FIG. 17 is a second schematic diagram of structural composition of a terminal according to this application.

When the processing unit is a processor and the storage module is a memory, the terminal 1600 in this embodiment of this application may be a terminal 1700 shown in FIG. 17. As shown in FIG. 17, the terminal 1700 includes a memory 1702, a display 1703, a communications interface 1704, and one or more processors 1701. The one or more processors 1701, the memory 1702, the communications interface 1704, and the display 1703 are connected to each other by using a bus 1705. The display 1703 is configured to display an image generated by the one or more processors 1701. The communications interface 1704 is configured to communicate with a wireless local area network hotspot (that is, a Wi-Fi hotspot), to establish a wireless local area network connection to the wireless local area network hotspot. The communications interface 1704 in this application may be a Wi-Fi interface in the terminal.

The memory 1702 is configured to store computer program code, where the computer program code includes an instruction. When the one or more processors 1701 of the terminal 1700 execute the instruction, the terminal 1700 performs related method steps in any one of the accompanying drawings FIG. 4, FIG. 7, and FIG. 15, to implement the method for establishing a wireless local area network connection in the foregoing embodiments.

The bus 1705 may be a peripheral component interconnect (Peripheral Component Interconnect, PCI) bus, an extended industry standard architecture (Extended Industry Standard Architecture, EISA) bus, or the like. The bus 1705 may be classified into an address bus, a data bus, a control bus, and the like. For ease of denotation, the bus 1705 is represented by using only one bold line in FIG. 17. However, this does not indicate that there is only one bus or only one type of bus.

An embodiment of the present invention further provides a computer storage medium. The computer storage medium stores computer program code. When the one or more processors 1701 of the terminal 1700 execute the computer program code, the terminal 1700 performs related method steps in any one of the accompanying drawings FIG. 4, FIG. 7, and FIG. 15, to implement the method for establishing a wireless local area network connection in the foregoing embodiments.

An embodiment of the present invention further provides a computer program product. When the computer program product runs on a computer, the computer is enabled to perform related method steps in any one of the accompanying drawings FIG. 4, FIG. 7, and FIG. 15, to implement the method for establishing a wireless local area network connection in the foregoing embodiments.

The terminal 1600, the terminal 1700, the computer storage medium, and the computer program product provided in the embodiments of the present invention are all configured to perform the corresponding methods provided in the foregoing. Therefore, for beneficial effects that can be achieved by the terminals, the computer storage medium, and the computer program product, reference may be made to beneficial effects of the corresponding methods provided in the foregoing, and details are not described herein again.

An embodiment of the present invention further provides a control apparatus, applicable to an electronic terminal. The control apparatus may be an independently sold chip, a control module, or a control device. When the control apparatus is applied to the electronic terminal, the control apparatus is coupled to other modules, such as a display, a memory, a transceiver, and an input/output interface, of the electronic terminal, so that the electronic terminal implements the functions in the foregoing embodiments. Therefore, for a function and implementation of the control apparatus, reference may be made to the foregoing embodiments. The control apparatus may include: a display module, configured to: in response to first input of a user, instruct to display a first setting interface on the electronic terminal, where the first setting interface includes at least two link identifiers pointing to a first hotspot, a first link identifier in the at least two link identifiers indicates a link for establishing a password-free connection to the first hotspot by using a first application, and a second link identifier indicates a link for establishing a connection to the first hotspot by using a native wireless local area network of the terminal; a first connection module, configured to: in response to an operation of selecting, by the user, the first link identifier displayed by the display module, establish a wireless local area network connection to the first hotspot by using the first application; and a second connection module, configured to: in response to an operation of selecting, by the user, the second link identifier displayed by the display module, establish a wireless local area network connection to the first hotspot by using native wireless local area network connection logic of the terminal. The first connection module may select, from the first link set in response to the operation of selecting the first link identifier by the user, a hotspot that is searched out by the first application and whose signal strength is highest; and establish, by using the first application, the wireless local area network connection to the hotspot whose signal strength is highest. The display module may display, in response to the first input of the user, the first link set and the second link set when the electronic terminal includes the first application; and display one or more link identifiers in the first link set in the first setting interface in response to an operation of unfolding the first link set by the user, where the one or more link identifiers in the first link set include at least the first link identifier. If the electronic terminal does not include the first application, the display module displays a second setting interface of the electronic terminal. The second setting interface includes the second link identifier pointing to the first hotspot, and does not include the first link identifier pointing to the first hotspot.

Referring to FIG. 5 and FIG. 8 to FIG. 14, an embodiment of the present invention further provides a graphical user interface (GUI). The graphical user interface is stored in an electronic device. The electronic device may include an input/output interface (for example, a touchscreen, a pressure screen, a physical/virtual keyboard, or a physical/virtual mouse), one or more memories, one or more processors, and the like. The graphical user interface includes a first GUI. The first GUI may be a home screen (Home screen), or may be an interface of an application program app, provided that the first GUI is not a WLAN setting interface. In response to first input of a user on the electronic terminal (for example, on a display of the electronic device), a second GUI is displayed. The second GUI displays at least two link identifiers pointing to a first hotspot, where a first link identifier in the at least two link identifiers indicates a link for establishing a password-free connection to the first hotspot by using a first application, and a second link identifier indicates a link for establishing a connection to the first hotspot by using a native wireless local area network of the terminal. In response to an operation of selecting the first link identifier by the user, the graphical user interface displays information indicating that the first link identifier for establishing a wireless local area network connection to the first hotspot by using the first application is selected, and establishment of the wireless local area network connection to the first hotspot by using the first application is being processed. In response to an operation of selecting, by the user, the second link identifier displayed by the display module, the graphical user interface displays information indicating that the second link identifier for establishing a wireless local area network connection to the first hotspot by using native wireless local area network connection logic of the electronic terminal is selected, and establishment of the wireless local area network connection to the first hotspot by using the native wireless local area network connection logic of the electronic terminal is being processed. The first link identifier is displayed in a first link set, and the first link set includes a set of at least hotspots to which a password-free connection can be established by using the first application. The second link identifier is displayed in a second link set, and the second link set includes a set of hotspots to which a connection can be established by using the native wireless local area network of the terminal. The in response to first input of a user on the touchscreen, displaying a second GUI specifically includes: in response to the first input of the user, displaying the second GUI, where the second GUI includes the first link set and the second link set and in response to an operation of unfolding the first link set by the user, displaying one or more link identifiers in the first link set in the second GUI, where the one or more link identifiers in the first link set include at least the first link identifier.

From descriptions of the foregoing implementations, it can be clearly understood by a person skilled in the art that, for ease and brevity of description, division of the foregoing function modules is merely an example for description. In actual application, the foregoing functions may be allocated, depending on a requirement, to different function modules for implementation. In other words, an internal structure of the apparatus is divided into different function modules to implement all or some of the functions described above. For specific working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is merely logical function division, and may be other division in actual implementation. For example, a plurality of units or components may be combined, or may be integrated into another system, or sonic features may be ignored or not performed. In addition, the displayed or discussed mutual couplings, direct couplings, or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on an actual requirement, to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods in the embodiments of this application. The foregoing storage medium includes various media that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for establishing a wireless local area network connection, wherein the method is applied to a terminal, and wherein the method comprises:
   displaying a first setting interface of the terminal in response to first input of a user, wherein the first setting interface comprises a first link identifier pointing to a first hotspot and a second link identifier pointing to the first hotspot, wherein the first link identifier indicates a first link for establishing a password-free wireless local area network connection to the first hotspot using a first application, and wherein the second link identifier indicates a second link for establishing a second wireless local area network connection to the first hotspot using a native wireless local area network connection logic of the terminal;
   establishing the password-free wireless local area network connection to the first hotspot using the first application in response to an operation of selecting the first link identifier by the user; and
   establishing the second wireless local area network connection to the first hotspot using the native wireless local area network connection logic of the terminal in response to an operation of selecting the second link identifier by the user.

2. The method of claim 1, further comprising:
   display the first link identifier in a first link set in the first setting interface, wherein the first link set is a first set of hotspots to which the password-free wireless local area network connection can be established using the first application; and
   displaying the second link identifier in a second link set in the first setting interface, wherein the second link set is a second set of hotspots to which the second wireless local area network connection can be established using the native wireless local area network connection logic of the terminal.

3. The method of claim 2, wherein establishing the password-free wireless local area network connection to the first hotspot using the first application comprises:
   searching, by the first application, for a hotspot whose signal strength is highest;
   selecting, from the first link set and in response to the operation of selecting the first link identifier by the user, the hotspot whose signal strength is highest; and
   establishing, using the first application, the password-free wireless local area network connection to the hotspot whose signal strength is highest.

4. The method of claim 2, wherein displaying the first setting interface of the terminal comprises:
   displaying the first link set and the second link set in response to the first input of the user; and
   displaying one or more link identifiers in the first link set in the first setting interface in response to an operation of unfolding the first link set by the user, wherein the one or more link identifiers in the first link set comprise at least the first link identifier.

5. The method of claim 1, wherein displaying the first setting interface of the terminal comprises displaying the first setting interface when the terminal comprises the first application.

6. The method of claim 5, wherein the method further comprises displaying, in response to the first input of the user, a second setting interface of the terminal when the terminal does not comprise the first application, wherein the second setting interface comprises the second link identifier pointing to the first hotspot, and wherein the second setting interface does not comprise the first link identifier pointing to the first hotspot.

7. The method of claim 1, wherein the first setting interface is a native Wi-Fi setting interface.

8. A terminal, comprising:
   one or more processors;
   a display coupled to the one or more processors and configured to display an image generated by the one or more processors;
   a communications interface configured to communicate with a wireless local area network hotspot to establish a wireless local area network connection to the wireless local area network hotspot; and
   memory coupled to the one or more processors and storing instructions that, when executed by the one or more processors, cause the terminal to be configured to:
      display, using the display, a first setting interface of the terminal in response to first input of a user, wherein the first setting interface comprises a first link identifier pointing to a first hotspot and a second link identifier pointing to the first hotspot, wherein the first link identifier indicates a first link for establishing a password-free wireless local area network connection to the first hotspot using a first application, and wherein the second link identifier indicates a second link for establishing a second wireless local area network connection to the first hotspot using a native wireless local area network connection logic of the terminal;
      establish, using the communications interface, the password-free wireless local area network connection to the first hotspot using the first application in response to an operation of selecting the first link identifier by the user; and
      establish, using the communications interface, the second wireless local area network connection to the first hotspot using the native wireless local area network connection logic of the terminal in response to an operation of selecting the second link identifier by the user.

9. The terminal of claim 8, wherein the instructions cause the display to:
 display the first link identifier in a first link set in the first setting interface, wherein the first link set is a first set of hotspots to which a password-free connection can be established by using the first application; and
 display the second link identifier in a second link set in the first setting interface, wherein the second link set is a second set of hotspots to which a connection can be established using the native wireless local area network connection logic of the terminal.

10. The terminal of claim 9, wherein the instructions cause the terminal to be configured to establish the password-free wireless local area network connection to the first hotspot by:
 searching, by the first application, for a hotspot whose signal strength is highest;
 selecting, from the first link set and in response to the operation of selecting the first link identifier by the user, the hotspot whose signal strength is highest; and
 establishing, using the first application, the password-free wireless local area network connection to the hotspot whose signal strength is highest.

11. The terminal of claim 9, wherein the instructions are configured to cause the terminal to display the first setting interface by:
 displaying the first link set and the second link set in response to the first input of the user; and
 displaying one or more link identifiers in the first link set in the first setting interface in response to an operation of unfolding the first link set by the user, wherein the one or more link identifiers in the first link set comprise at least the first link identifier.

12. The terminal of claim 8, wherein the instructions are configured to cause the terminal to display the first setting interface in response to the first input of the user when the terminal comprises the first application.

13. The terminal of claim 12, wherein the instructions are further configured to cause the terminal to display, in response to the first input of the user, a second setting interface of the terminal when the terminal does not comprise the first application, wherein the second setting interface comprises the second link identifier pointing to the first hotspot, and wherein the second setting interface does not comprise the first link identifier pointing to the first hotspot.

14. A computer program product comprising computer-executable instructions stored on a non-transitory computer-readable medium that, when executed by a processor, cause a terminal to be configured to:
 display a first setting interface of the terminal in response to first input of a user, wherein the first setting interface comprises a first link identifier pointing to a first hotspot and a second link identifier pointing to the first hotspot, wherein the first link identifier indicates a first link for establishing a password-free wireless local area network connection to the first hotspot using a first application, and wherein the second link identifier indicates a second link for establishing a second wireless local area network connection to the first hotspot using a native wireless local area network connection logic of the terminal;
 establish the password-free wireless local area network connection to the first hotspot using the first application in response to an operation of selecting the first link identifier by the user; and
 establish the second wireless local area network connection to the first hotspot using the native wireless local area network connection logic of the terminal in response to an operation of selecting the second link identifier by the user.

15. The computer program product of claim 14, wherein the computer-executable instructions cause the terminal to:
 display the first link identifier in a first link set in the first setting interface, wherein the first link set is a first set of hotspots to which a password-free connection can be established using the first application; and
 display the second link identifier in a second link set in the first setting interface, wherein the second link set is a second set of hotspots to which a connection can be established using the native wireless local area network connection logic of the terminal.

16. The computer program product of claim 15, wherein the computer-executable instructions cause the terminal to be configured to establish the password-free wireless local area network connection to the first hotspot by:
 searching, by the first application, for a hotspot whose signal strength is highest;
 selecting, from the first link set and in response to the operation of selecting the first link identifier by the user, the hotspot whose signal strength is highest; and
 establishing, using the first application, the password-free wireless local area network connection to the hotspot whose signal strength is highest.

17. The computer program product of claim 14, wherein computer-executable instructions cause the terminal to display the first setting interface by:
 displaying the first link set and the second link set in response to the first input of the user; and
 displaying one or more link identifiers in the first link set in the first setting interface in response to an operation of unfolding the first link set by the user, wherein the one or more link identifiers in the first link set comprise at least the first link identifier.

18. The computer program product of claim 14, wherein the computer-executable instructions cause the terminal to display the first setting interface in response to the first input of the user when the terminal comprises the first application.

19. The computer program product of claim 18, wherein the computer-executable instructions further cause the terminal to, in response to the first input of the user, display a second setting interface of the terminal when the terminal does not comprise the first application, wherein the second setting interface comprises the second link identifier pointing to the first hotspot, and wherein the second setting interface does not comprise the first link identifier pointing to the first hotspot.

20. The computer program product of claim 14, wherein the first setting interface is a native Wi-Fi setting interface.

* * * * *

UNITED STATES PATENT AND TRADEMARK OFFICE
CERTIFICATE OF CORRECTION

| | | |
|---|---|---|
| PATENT NO. | : 10,917,792 B2 | Page 1 of 1 |
| APPLICATION NO. | : 16/488816 | |
| DATED | : February 9, 2021 | |
| INVENTOR(S) | : Fei Ye and Yongming Yan | |

It is certified that error appears in the above-identified patent and that said Letters Patent is hereby corrected as shown below:

On the Title Page

(57) Abstract, Lines 1 and 2: "connection is provided, comprising: in response" should read "connection includes, in response"

(57) Abstract, Line 9: "terminal; in response" should read "terminal. The method further includes, in response"

(57) Abstract, Line 11: "application; and in" should read "application. The method further includes, in"

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*